(12) United States Patent
Nakamura

(10) Patent No.: US 10,288,259 B2
(45) Date of Patent: May 14, 2019

(54) LIGHT EMITTING UNIT, DISPLAY, AND LIGHTING APPARATUS

(71) Applicant: Sony Corporation, Tokyo (JP)

(72) Inventor: Tomoharu Nakamura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/604,758

(22) Filed: May 25, 2017

(65) Prior Publication Data

US 2017/0261180 A1 Sep. 14, 2017

Related U.S. Application Data

(63) Continuation of application No. 13/856,645, filed on Apr. 4, 2013, now Pat. No. 10,041,648.

(30) Foreign Application Priority Data

Apr. 11, 2012 (JP) .................. 2012-090212

(51) Int. Cl.
*F21V 9/00* (2018.01)
*G02F 1/1335* (2006.01)

(52) U.S. Cl.
CPC .......... *F21V 9/00* (2013.01); *G02F 1/133615* (2013.01); *G02F 2001/133614* (2013.01)

(58) Field of Classification Search
CPC ................. F21V 9/00; G02F 1/133615; G02F 2001/133614
See application file for complete search history.

(56) References Cited

U.S. PATENT DOCUMENTS

| | | | |
|---|---|---|---|
| 6,501,091 B1 | 12/2002 | Bawendi et al. | |
| 6,803,719 B1 | 10/2004 | Miller et al. | |
| 7,891,852 B2 | 2/2011 | Pugh et al. | |
| 2001/0053073 A1 | 12/2001 | Itoh et al. | |
| 2009/0122216 A1* | 5/2009 | Kogure | B29C 47/0019 349/58 |
| 2011/0282660 A1* | 11/2011 | Hetherington | G10L 21/0208 704/226 |

(Continued)

FOREIGN PATENT DOCUMENTS

| | | | | |
|---|---|---|---|---|
| EP | 2392852 A2 * | 12/2011 | ......... | H01L 25/0753 |
| EP | 2562589 A1 * | 2/2013 | ....... | G02F 1/133603 |

(Continued)

OTHER PUBLICATIONS

European Search Report from EP Application No. 13162070, dated Jul. 25, 2013.

*Primary Examiner* — Sean P Gramling
*Assistant Examiner* — Naomi M Wolford
(74) *Attorney, Agent, or Firm* — Lerner, David, Littenberg, Krumholz & Mentlik, LLP

(57) ABSTRACT

There are provided a light emitting unit using a wavelength conversion member which may be put to practical use, and a display and a lighting apparatus which include the light emitting unit. The light emitting unit includes: a light source; an optical part including a light incident surface, the light incident surface facing the light source; a wavelength conversion member provided between the light source and the light incident surface; and a holding member holding the wavelength conversion member at a position between the light source and the light incident surface of the optical part.

19 Claims, 22 Drawing Sheets

(56) References Cited

U.S. PATENT DOCUMENTS

2011/0292660 A1    12/2011  Eichelberger
2013/0050616 A1     2/2013  Seo et al.

FOREIGN PATENT DOCUMENTS

| JP | 03114805 B2  | 12/2000 |
| JP | 3116727 B2   | 12/2000 |
| JP | 2011222665 A | 11/2011 |
| KR | 20090021912 A | 3/2009 |

* cited by examiner

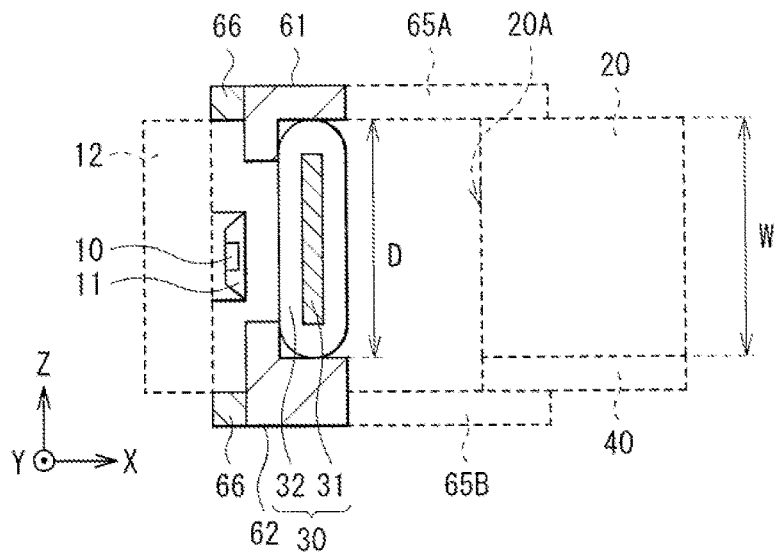
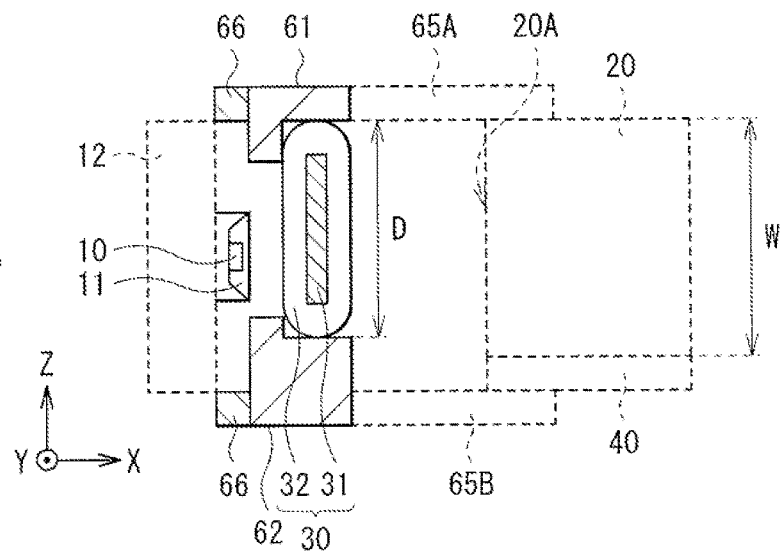

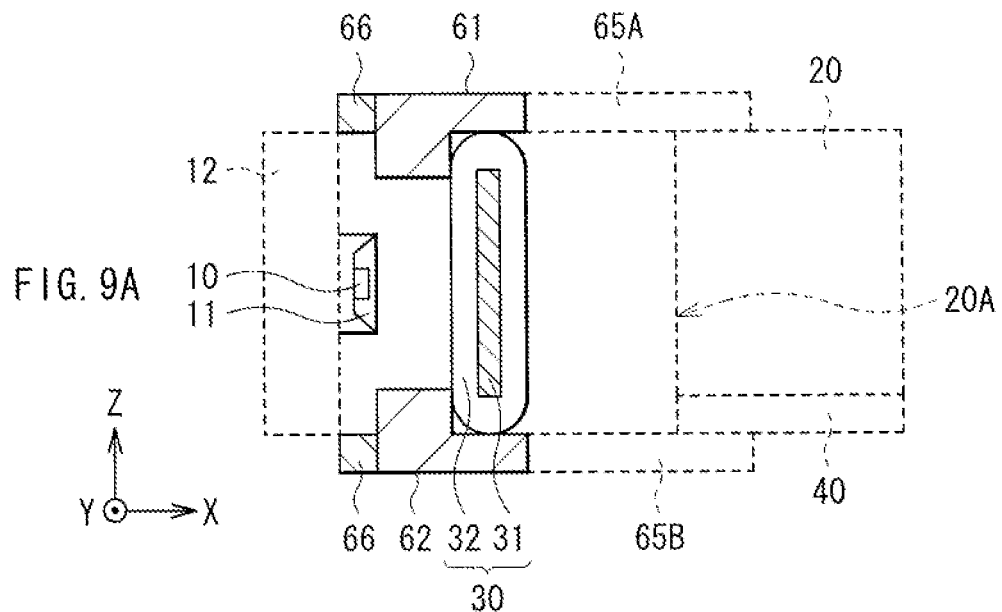
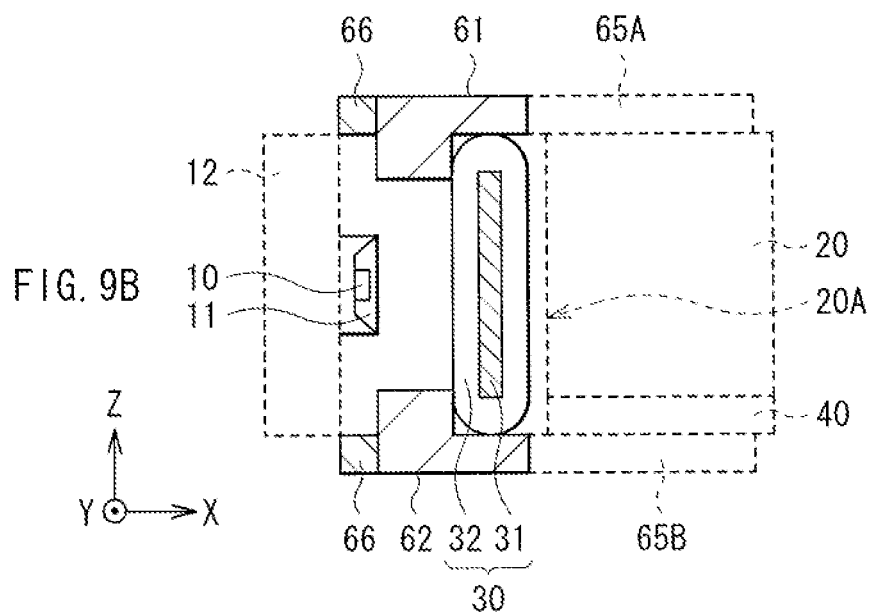

LIGHT EMITTING UNIT, DISPLAY, AND LIGHTING APPARATUS

CROSS-REFERENCE TO RELATED APPLICATION

The present application is a continuation of U.S. patent application Ser. No. 13/856,645 filed on Apr. 4, 2013 which application claims priority from Japanese Patent Application No. JP 2012-090212 filed in the Japanese Patent Office on Apr. 11, 2012, the entire content of which is incorporated herein by reference.

BACKGROUND

The present technology relates to a light emitting unit suitable for a planar light source, and to a display and a lighting apparatus which include the light emitting unit.

LEDs (light emitting diodes) are used as a backlight of a liquid crystal display, and a light source of a lighting apparatus and the like. Such a backlight and the like typically use a method in which LED light of red, green, and blue are synthesized to generate white light. However, it is difficult to stably obtain uniform white light by using the above-mentioned method of synthesizing light of plural colors. Therefore, methods have been proposed in which wavelength conversion of LED light of single color, for example, blue color, is performed with use of fluorescent pigment or fluorescent dye (see, for example, Japanese Patent Nos. 3116727 and 3114805).

SUMMARY

However, the above-mentioned method for wavelength conversion of blue LED light has not yet been put to practical use.

It is therefore desirable to provide a light emitting unit using a wavelength conversion member which may be put to practical use, and a display and a lighting apparatus which include the light emitting unit.

According to an embodiment of the present technology, there is provided a light emitting unit including: a light source; an optical part including a light incident surface, the light incident surface facing the light source; a wavelength conversion member provided between the light source and the light incident surface; and a holding member holding the wavelength conversion member at a position between the light source and the light incident surface of the optical part.

According to an embodiment of the present technology, there is provided a display with a liquid crystal panel and a light emitting unit disposed on a back side of the liquid crystal panel. The light emitting unit includes: a light source; an optical part including a light incident surface, the light incident surface facing the light source; a wavelength conversion member provided between the light source and the light incident surface; and a holding member holding the wavelength conversion member at a position between the light source and the light incident surface of the optical part.

According to an embodiment of the present technology, there is provided a lighting apparatus with a light emitting unit. The light emitting unit includes: a light source; an optical part including a light incident surface, the light incident surface facing the light source; a wavelength conversion member provided between the light source and the light incident surface; and a holding member holding the wavelength conversion member at a position between the light source and the light incident surface of the optical part.

According to the light emitting unit, the display, and the lighting apparatus of the embodiments of the present technology, the wavelength conversion member and the light source are distanced by a predetermined interval by the holding member.

According to the light emitting unit, the display, and the lighting apparatus of the embodiments of the present technology, since the holding member that holds the position of the wavelength conversion member is provided, it is possible to prevent the light source and the wavelength conversion member from contacting each other, thereby preventing breakage from occurring. Consequently, it is possible to realize the practical use with improved reliability.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 7A and 7B are sectional views each showing another example of a wavelength conversion member different in size from the wavelength conversion member illustrated in FIGS. 5A to 5C.

FIGS. 9A and 9B are sectional views for describing a distance between the wavelength conversion member and a light guide plate illustrated in FIGS. 5A to 5C.

DETAILED DESCRIPTION

In the following, embodiments of the present technology will be described in detail with reference to the drawings. It is to be noted that description will be made in the following order.

1. First Embodiment (light emitting unit: an example of a holding member that supports a wavelength conversion member over an extending direction of the wavelength conversion member)

2. Second Embodiment (light emitting unit: an example of a holding member that supports a wavelength conversion member at a part of the wavelength conversion member)

3. Third Embodiment (light emitting unit: an example in which a holding member includes a housing section (first housing section) for a wavelength conversion member and a housing section (second housing section) for a light source)

4. Modification 1 (an example in which a first housing section includes a tapered section)

5. Modification 2 (an example in which a second housing section includes a reflection section)

6. Application Examples (a display and a lighting apparatus)

7. Examples

First Embodiment

Figure 1:
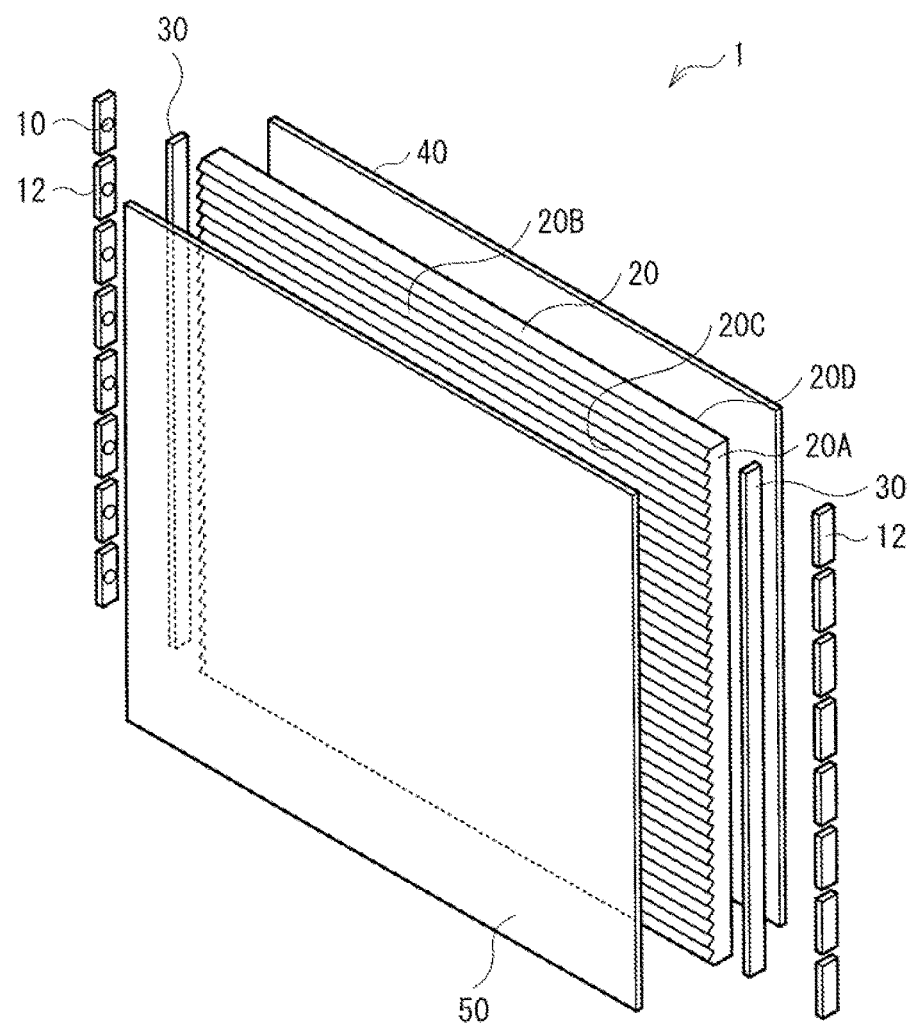
FIG. 1 is a perspective view showing a general configuration of a light emitting unit according to a first embodiment of the present technology.

FIG. 1 shows a general configuration of a light emitting unit (light emitting unit 1) according to a first embodiment of the present technology. This light emitting unit 1 is used as, for example, a backlight that illuminates a transmission-type liquid crystal panel from a rear side, and is provided with a light source 10, a light guide plate 20 (optical part), a wavelength conversion member 30, a reflective member 40, and an optical sheet 50. The light guide plate 20 has a left end surface and a right end surface each serving as a light incident surface 20A, and main surfaces (broadest surfaces) serving as light emission surfaces 20B and 20D. In other words, the light emitting unit 1 is an edge-lit type light emitting unit.

In this specification, a Z direction (front-rear direction) is a direction in which the optical sheet 50, the light guide plate 20, and the reflective member 40 are laminated, an X direction is a lateral direction of the main surface of the light guide plate 20, and a Y direction is a vertical direction of the main surface of the light guide plate 20.

The light source 10 is an LED that generates, for example, blue light (of wavelength of about 440 nm to about 460 nm both inclusive, for example), and a plurality of the light sources 10 are provided in facing relation to the light incident surface 20A of the light guide plate 20. Specifically, the light source 10 is sealed in a package (a package 11 in FIG. 3B described later), and mounted on a light source substrate 12. The package 11 has a planar shape of a rectangular with a long side of about 1.8 mm to about 7 mm both inclusive and a short side of about 1 mm to about 4 mm both inclusive, for example, and the thickness (in the X direction) thereof is about 0.5 mm, for example. It is preferable to use the light source 10 having a small size in order to efficiently improve luminance, but, for example, the light source 10 with a long side of about 7 mm or more may also be used. The light source substrate 12 is, for example, a glass epoxy substrate, a metal substrate, or a flexible substrate having a rectangular shape, on which a wiring pattern is formed. The light source substrate 12 supports the light source 10 and supplies electricity to the light source 10. A plurality of the light source substrates 12 (the light sources 10) are disposed in a line along a longitudinal direction (along the Y direction). The number of the light source 10 may be one.

The light guide plate 20 mainly includes, for example, a transparent thermoplastic resin such as a polycarbonate resin (PC) and an acrylic resin, and guides the light from the light source 10 incident on the light incident surface 20A to a light emission surface 20B (the main surface on the optical sheet 50 side in FIG. 1). The light emission surface 20B is provided with a concavo-convex pattern configured of minute convex sections 20C in order to improve straightness of the light traveling in the light guide plate 20, for example. The convex section 20C has a belt shape extending in one direction of the light emission surface 20B (in the X direction in FIG. 1), for example. On a light emission surface 20D provided oppositely to the light emission surface 20B, for example, a scattering agent is printed in a patterned manner, as a scattering section that scatters and uniformizes the light traveling in the light guide plate 20. In place of the scattering agent, it is also possible to provide a section including filler, or to partially provide a rough surface on the front surface, as the scattering section.

The wavelength conversion member 30 is provided between the light source 10 and the light incident surface 20A of the light guide plate 20. The wavelength conversion member 30 absorbs light having a wavelength outputted by the light source 10, and thereafter generates light having a wavelength different from that of the light outputted by the light source 10. Specifically, after being subjected to wavelength conversion in part or in whole at the wavelength conversion member 30, the light from the light source 10 enters the light incident surface 20A. In the first embodiment, the wavelength conversion member 30 is held by a holding member 60 illustrated in FIG. 2. This makes it possible to prevent the light source 10 and the wavelength conversion member 30 from contacting each other, thus improving reliability.

Figure 3A:
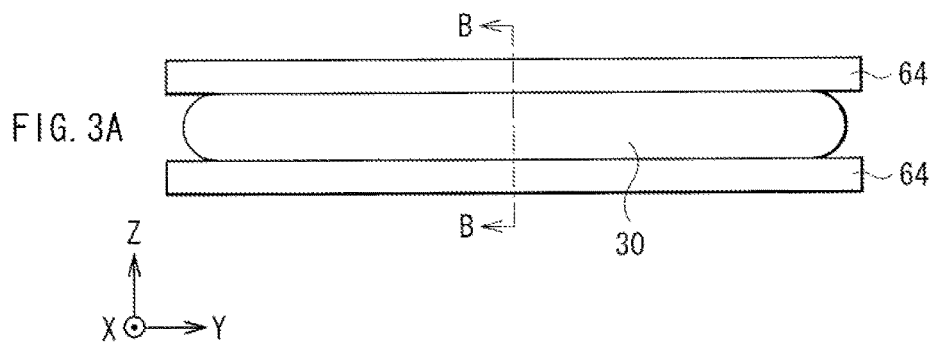
FIGS. 3A and 3B are views each showing a state where the wavelength conversion member is mounted on the holding member illustrated in FIG. 2.
Figure 3B:
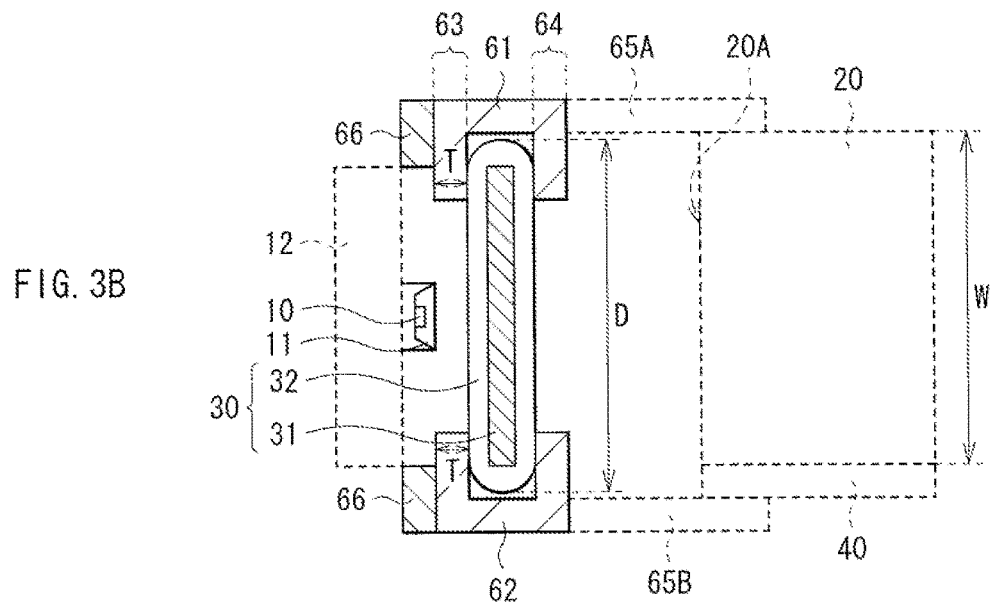

FIGS. 3A and 3B each show a state where the wavelength conversion member 30 is fixed to the holding member 60. FIG. 3A shows a planar configuration as viewed from the light incident surface 20A of the light guide plate 20, and FIG. 3B shows a cross-sectional configuration taken along a line B-B in FIG. 3A. Specifically, the wavelength conversion member 30 includes, for example, a tubular container 32 (capillary) made of glass or the like and a wavelength conversion material 31 sealed in the container 32. The container 32 (the wavelength conversion member 30) extends along a length direction (along the Y direction) of the light incident surface 20A. The wavelength conversion material 31 contains, for example, a fluorescent pigment, a fluorescent dye, quantum dots, etc., absorbs light of the light source 10 to convert part or all of the absorbed light into light having a different wavelength, and emits the converted light. The wavelength conversion material 31 absorbs blue light of the light source 10, and converts part of the light thus absorbed into red light (wavelength of about 620 nm to about 750 nm both inclusive) or into green light (wavelength of about 495 nm to about 570 nm both inclusive), for example. Accordingly, when the light of the light source 10 passes through the wavelength conversion material 31, light of red, green, and blue are synthesized to generate white light. The container has a role to suppress degradation of the wavelength conversion material 31 due to factors such as moisture and oxygen in the atmosphere, and to improve the handleability of the wavelength conversion material 31. The tubular container 32 is substantially rectangular in cross-section (Z-X cross-section), and has a longitudinal diameter D (along the Z direction) of, for example, about 2 mm to about 5 mm both inclusive (FIG. 3B). The container 32 has a thickness (along the X direction) of, for example, about 1.0 mm.

The wavelength conversion material 31 preferably contains quantum dots. A quantum dot is a particle having a longitudinal diameter of about 1 nm to about 100 nm both inclusive, and has a discrete energy level. The energy state of a quantum dot depends on the size thereof, and therefore the light-emission wavelength may be freely selected by changing the size thereof. In addition, the spectral width of light emitted by quantum dots is narrow. Combining light having such a steep peak expands color gamut. Accordingly, the use of quantum dots as the wavelength conversion material makes it possible to easily expand the color gamut. Further, since quantum dots have high responsiveness, it is possible to efficiently utilize the light of the light source 10. Additionally, quantum dots have high stability. Examples of the quantum dot include compounds of group 12 elements with group 16 elements, compounds of group 13 elements with group elements, compounds of group 14 elements with group 16 elements, and the like. Examples of such compounds include CdSe, CdTe, ZnS, CdS, PdS, PbSe, and CdHgTe.

The holding member 60 is a holder provided to fix the wavelength conversion member 30, and has a function to maintain the interval between the wavelength conversion member and the light source 10 at a predetermined value. The holding member 60 includes a top face section 61 and a bottom face section 62 separated from each other, and the light generated at the light source 10 passes through a space between the top face section 61 and the bottom face section 62 toward the light incident surface 20A (in the X direction). The top face section 61 and the bottom face section 62 each extend in the same direction as the container 32 (in the Y direction). The distance between the top face section 61 and the bottom face section 62 (in the Z direction) is preferably equal to the longitudinal diameter D. The top face section 61 and the bottom face section 62 each include a first lock section 63 on the light source 10 side, and a second lock section 64 on the light guide plate 20 side, thereby holding the wavelength conversion member 30. Along with the above-mentioned function as a holder, the holding member 60 has a function to enhance the efficiency of extraction of the light from the wavelength conversion member 30. The light from the wavelength conversion member 30 is emitted in all directions, and by reflecting this light by the holding member 60 (the top face section 61 and the bottom face section 62), use efficiency of the light from the wavelength conversion member 30 is enhanced.

The first lock section 63 is provided at both the top face section 61 and the bottom face section 62 over the extending direction thereof (in the Y direction). The pair of first lock sections 63 are provided upright to face each other in an vertical direction (in the Z direction) with respect to the top face section 61 and the bottom face section 62 (FIG. 2), and thus the light source 10 side of the container 32 (the wavelength conversion member 30) is supported. The light source substrate 12 mounted with the light source 10 is held by, for example, a fixing section 66 (FIG. 3B) at a predetermined position with respect to the holding member 60. In other words, the light source 10 (the package 11) and the wavelength conversion member 30 (the container 32) are distanced by a thickness T (in the X direction) of the first lock section 63 or more (FIG. 3B). Accordingly, adjusting the thickness T of the first lock section 63 makes it possible to prevent the light source 10 and the wavelength conversion member 30 from contacting each other. Since the use efficiency of the light of the light source 10 may be decreased if the light source 10 and the wavelength conversion member 30 are overly distanced from each other, and therefore, preferably, the fixing section 66 is so adjusted as to make the distance between the light emission surface of the light source 10 and the wavelength conversion member 30, and the thickness T of the first lock section 63 be equal to each other. In addition, it is preferable to make the amount of light of the light source 10 reflected by the first lock section 63 as small as possible by decreasing the thickness T in consideration of the thermal expansion coefficient of the container 32, the package of the light source 10, and the like. The thickness T of the first lock section 63 is about 0.8 mm, for example.

Figure 2:
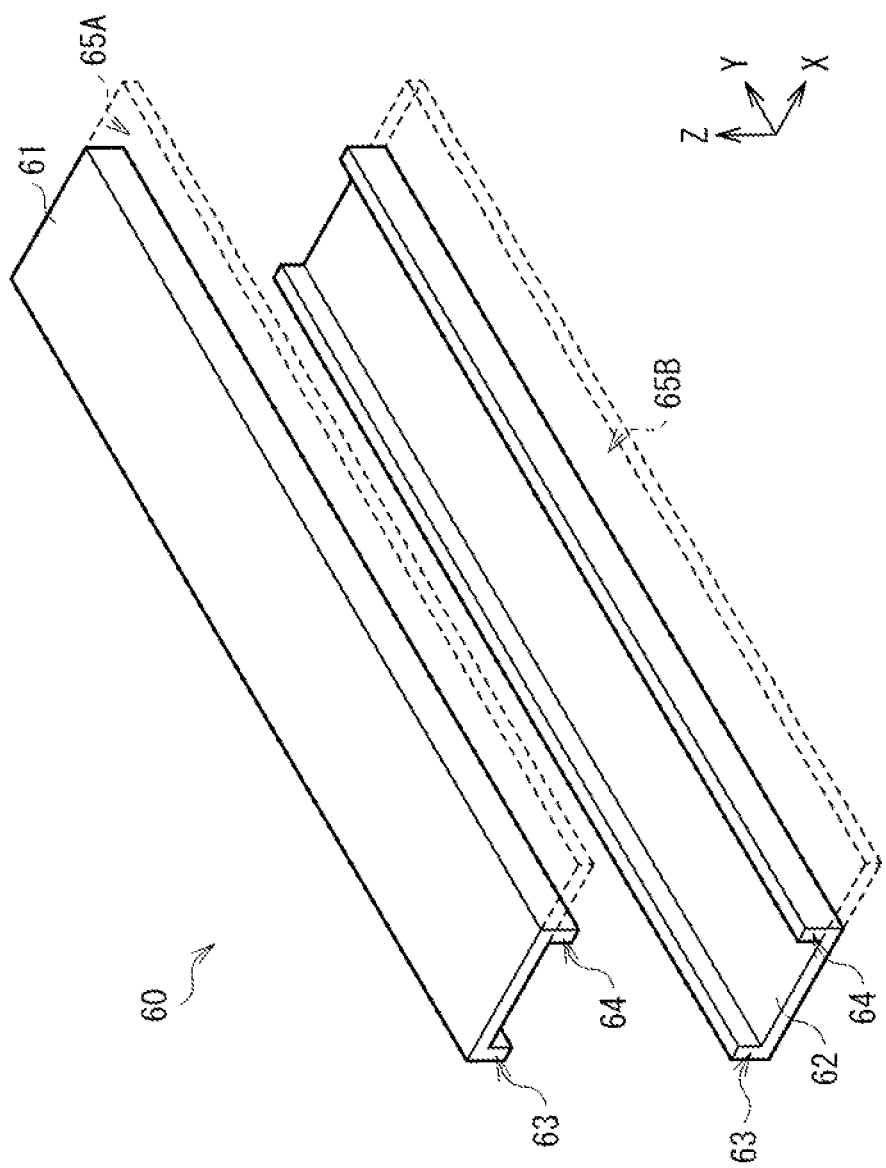
FIG. 2 is a perspective view showing a configuration of a holding member that holds a wavelength conversion member illustrated in FIG. 1.

Similarly to the above-mentioned first lock section 63, the second lock section 64 is also provided at both the top face section 61 and the bottom face section 62 over the extending direction thereof (in the Y direction), and the second lock sections 64 are provided upright to face each other in an vertical direction (in the Z direction) with respect to the top face section 61 and the bottom face section (FIG. 2). The pair of second lock sections 64 support the light guide plate 20 (the light incident surface 20A) side of the container 32 (the wavelength conversion member 30), and thus the container 32 is fixed at a predetermined position. The length of the first lock section 63 and the second lock section 64 in the upright direction (in the Z direction) is, for example, about 0.8 mm.

As illustrated with a broken line in FIG. 2, the top face section 61 and the bottom face section 62 of the holding member 60 may be provided with eaves sections 65A and 65B, respectively, on the outer side of the second lock section 64. The light guide plate 20 and the reflective member 40 are interposed and held between the eaves section 65A and the eaves section 65B.

Since the holding member 60 is designed to be disposed near the light source 10, the holding member 60 is made of a material having a high heat resistance and a high light resistance. In addition, it is preferable to use a material having a low thermal expansion coefficient as the holding member 60 in order to improve reliability. Further, the material of the holding member 60 preferably has a high reflectance in order to effectively utilize the light of the light source 10. Examples of the material of the holding member 60 include resins mixed with a metal having a high reflectance such as titanium oxide, and examples of such resins include a highly reflective PC (polycarbonate), a highly reflective PPA (polyphthalamide), a highly reflective PPA/PCT (polycyclohexylene dimethylene terephthalate), and a highly reflective epoxy resin. In the case where the container 32 is made of glass, it is preferable to include PPA which is close to glass in thermal expansion coefficient and is advantageous in terms of cost. Specifically, "Genestar (registered trademark)" available from Kuraray Co., Ltd and the like may be used. The holding member 60 may also be configured of a metal with highly reflective coating. It is also possible to provide, for example, a heat release member such as a heat spreader (not illustrated) on the outer side of the holding member 60, for example, on the light source 10 side.

The reflective member 40 (FIG. 1) is a member that has a plate shape or a sheet shape and faces the main surface of the light guide plate 20. The reflective member 40 is provided on the light emission surface 20D side of the light guide plate 20 (on the side opposite to the optical sheet 50). The reflective member 40 redirects, back to the light guide plate 20 side, light of the light source 10 leaked to the light emission surface 20D side of the light guide plate 20, and light emitted to the light emission surface 20D side from the inside of the light guide plate 20. The reflective member has a function of, for example, reflecting, diffusing, scattering, and the like. With this, it is possible to efficiently utilize the light from the light source 10, and thus to enhance the front surface luminance.

The reflective member 40 is configured of, for example, a foamed PET (polyethylene terephthalate), an evaporated silver film, a multi-layer reflection film, or a white PET. In the case of providing the reflective member 40 with a function of regular reflection (mirror reflection), it is preferable to previously perform processes such as silver evaporation, aluminum evaporation, and multi-layer evaporation on the front surface thereof. In the case where the reflective member 40 has a minute form, such a minute form may be integrally formed by a method such as melt extrusion molding and hot press molding using a thermoplastic resin, for example. Examples of such a thermoplastic resin include PC, an acrylic resin such as PMMA (polymethyl methacrylate), a polyester resin such as PET, an amorphous copolyester resin such as MS (methyl methacrylate-styrene copolymer), a polystyrene resin, a polyvinyl chloride resin, and the like. For example, the minute form may be formed such that after an energy-ray (for example, ultraviolet) curable resin is applied on a base material made of PET or glass, a pattern is transferred to the base material.

The optical sheet 50 is provided on the light emission surface 20B (front surface) side of the light guide plate 20, and includes, for example, a diffusion plate, a diffusion sheet, a lens film, a polarization separate sheet, and the like. FIG. 1 shows only one of the above-mentioned optical sheets 50. Providing the optical sheet 50 makes it possible to raise the light emitted by the light guide plate 20 in an oblique direction to a front direction, and thus to enhance the front surface luminance.

In the light emitting unit 1, the wavelength conversion member 30 performs wavelength conversion of the light generated at the light source 10, and the light thus converted enters the light incident surface 20A of the light guide plate 20. This light advances inside the light guide plate 20, exits the light guide plate 20 from the light emission surface 20B, and passes through the optical sheet 50.

In this instance, the holding member 60 holds the wavelength conversion member 30 at a predetermined position between the light source 10 and the light guide plate 20. With this configuration, reliability of the light emitting unit 1 is improved.

In order to cause the light generated at the light source 10 to enter the light guide plate 20 efficiently, it is conceivable that the light source 10, the wavelength conversion member 30, and the light guide plate 20 are fixed by, for example, an adhesive agent to ensure the adhesion thereof as much as possible. However, when the light emitting unit is driven in such a state, due to the difference in thermal expansion coefficient between the light source, the container of the wavelength conversion member, the adhesive agent, and the like, the light source and the container may come into contact with each other, and thus breakage may occur. Accordingly, it is difficult to guarantee the reliability thereof. In addition, the light generated at the wavelength conversion member may be emitted in all directions, and thus the light entrance efficiency at the light incident surface 20A of the light guide plate 20 may be decreased.

In contrast, in the first embodiment, the wavelength conversion member 30 is held at a predetermined position by the holding member 60. In other words, the holding member 60 maintains the distance between the light source 10 and the wavelength conversion member 30 at a predetermined value. Consequently, it is possible to stably obtain uniform light by the wavelength conversion member 30, and to prevent breakage of the light source 10, the container 32 of the wavelength conversion member 30, and the like, thus improving reliability.

In addition, reflecting the light emitted from the wavelength conversion member 30 by the top face section 61 and the bottom face section 62 makes it possible to efficiently cause the light generated at the wavelength conversion member 30 to enter the light incident surface 20A of the light guide plate 20.

As described above, since the holding member 60 is provided in the first embodiment, it is possible to improve reliability of the light emitting unit 1. Accordingly, it is possible to practically use the light emitting unit 1 provided with the wavelength conversion member 30. In addition, it is possible to suppress the reduction in light entrance efficiency, of the light coming from the light source 10 through the wavelength conversion member 30, at the light incident surface 20A of the light guide plate 20.

While other embodiments and modifications thereof will be described below, the same components as those of the above-mentioned first embodiment will be given the same reference numerals, and their descriptions will not be described in detail for simplicity.

Second Embodiment

Figure 4:
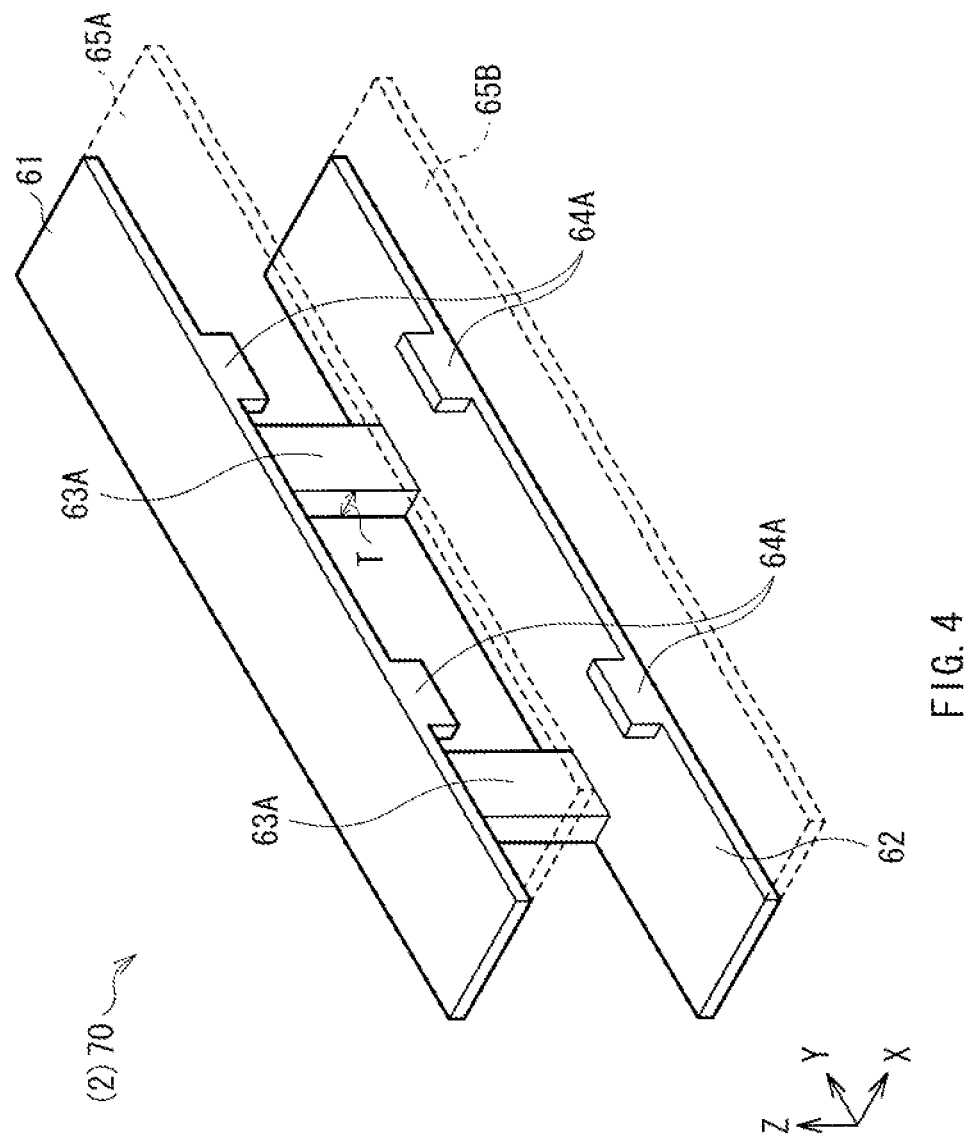
FIG. 4 is a perspective view showing a configuration of a holding member (light emitting unit) according to a second embodiment of the present technology.

A light emitting unit (light emitting unit 2) according to a second embodiment of the present technology includes a holding member 70 illustrated in FIG. 4. In the holding member 70, lock sections (first lock sections 63A and second lock sections 64A) provided at a part of the top face section 61 and the bottom face section 62 support the wavelength conversion member 30. Except for that point, the light emitting unit 2 is the same as the light emitting unit 1 of the above-mentioned first embodiment in configuration, functions, and effects.

Figure 5A:
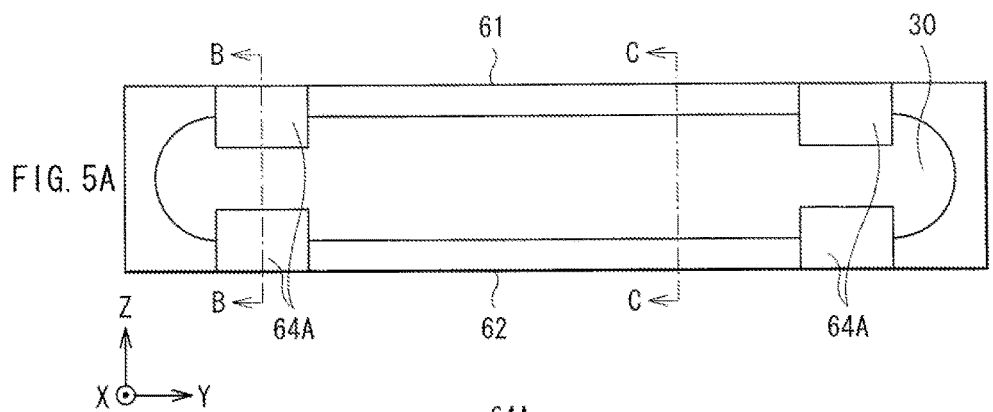
FIGS. 5A to 5C are views each showing a state where a wavelength conversion member is mounted on the holding member illustrated in FIG. 4.
Figure 5B:
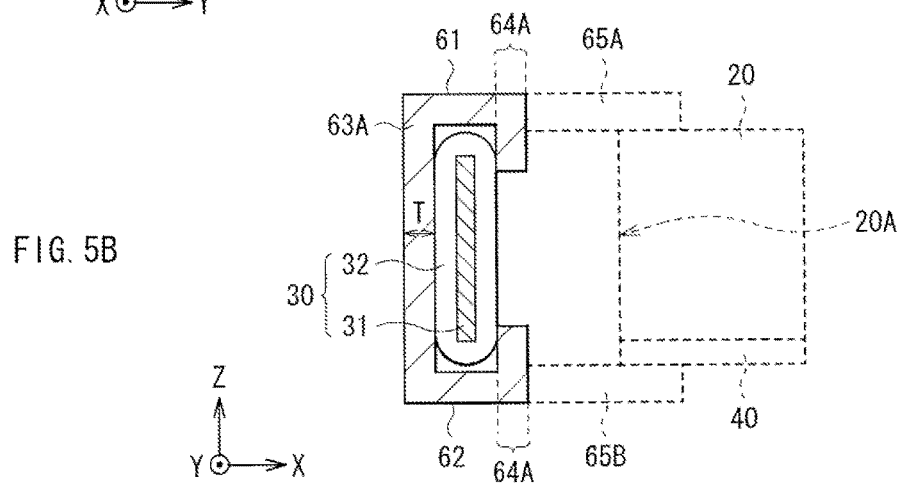
Figure 5C:
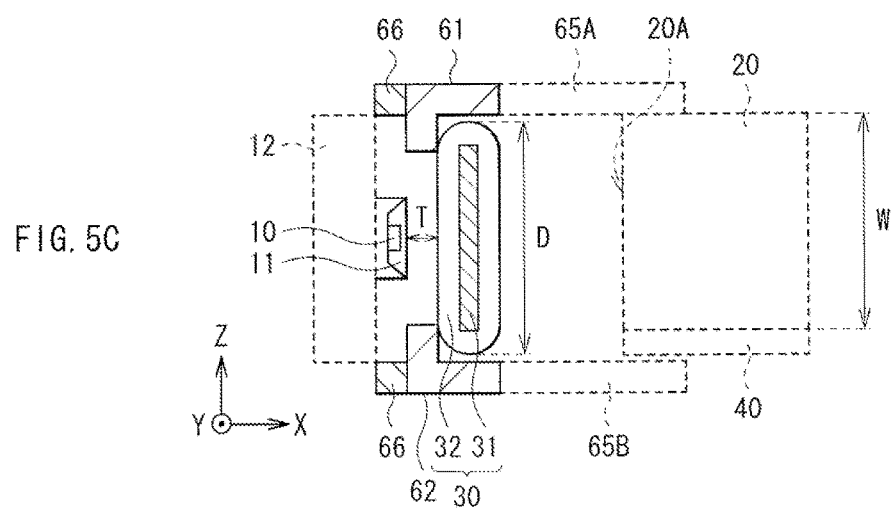

FIGS. 5A to 5C each show a state where the wavelength conversion member 30 is fixed to the holding member 70. FIG. 5A shows a planar configuration as viewed from the light incident surface 20A of the light guide plate 20, FIG. 5B shows a cross-sectional configuration taken along a line B-B in FIG. 5A, and FIG. 5C shows a cross-sectional configuration taken along a line C-C in FIG. 5A.

The first lock section 63A of the holding member 70 has a columnar shape that connects the top face section 61 and the bottom face section 62 (FIG. 4) together, and supports the container 32 over the longitudinal diameter D thereof (FIG. 5B). The light source 10 (the package 11) and the wavelength conversion member 30 (the container 32) are distanced by the thickness T of the first lock section 63A (in the X direction) or more (FIGS. 5B and 5C). Accordingly, adjusting the thickness T of the first lock section 63A makes it possible to prevent the light source 10 and the wavelength conversion member 30 from contacting each other. To suppress reflection at the first lock section 63A, the light source 10 is provided in such a manner as to avoid a position facing the first lock section 63A, for example.

Figure 6:
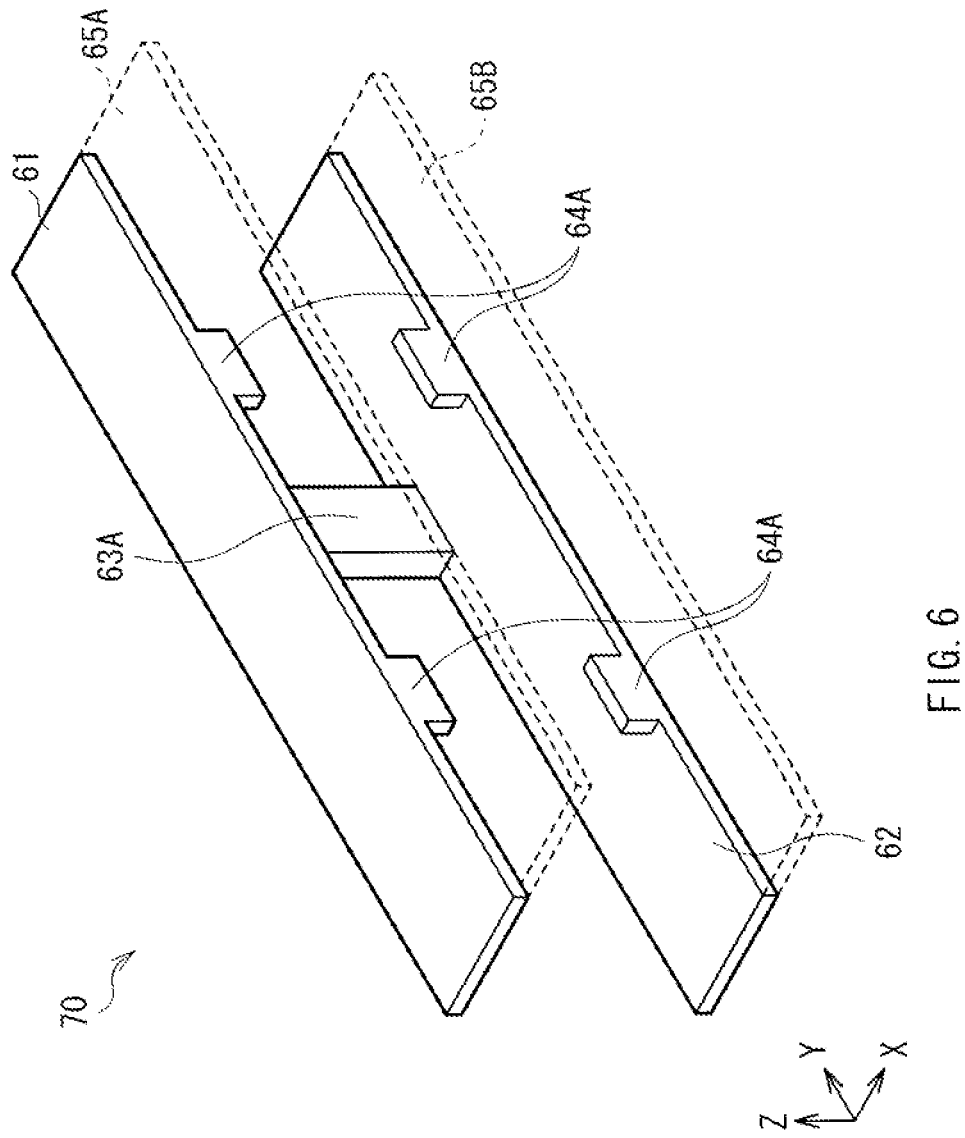
FIG. 6 is a perspective view showing another example of the holding member illustrated in FIG. 4.

The second lock sections 64A are provided at a part of the top face section 61 and a part of the bottom face section 62, and are provided upright to face each other in an vertical direction (in the Z direction) with respect to the top face section 61 and the bottom face section 62. The pair of the second lock sections 64A makes it possible to support the light guide plate 20 side of the container 32 and to hold the wavelength conversion member 30 at a predetermined position. The first lock section 63A and the second lock section 64A may be provided to face each other with the wavelength conversion member 30 therebetween (FIG. 4), or may be alternately provided as illustrated in FIG. 6. The second lock section 64A of the top face section 61 and the second lock section 64A of the bottom face section 62 may not face each other (not illustrated). While FIG. 4 illustrates a case where a plurality (two) of the first lock sections 63A and the second lock sections 64A are provided, the number of each of the first lock section 63A and the second lock section 64A may be one.

When the wavelength conversion member 30 is held by the first lock sections 63A and the second lock sections 64A provided at a part of the top face section 61 and the bottom face section 62, it is possible to suppress vignetting of the light generated at the wavelength conversion member 30. Accordingly, compared to the holding member 60 of the above-mentioned first embodiment, it is possible to enhance the light entrance efficiency of the light from the wavelength conversion member 30 to the light incident surface 20A of the light guide plate 20.

In addition, in order to improve the light entrance efficiency of the light from the wavelength conversion member 30 to the light guide plate 20, the longitudinal diameter D is preferably equal to or close to a width W of the light incident surface 20A (in the Z direction) in size. The longitudinal diameter D may be greater than the width W (FIG. 5C), or equal to the width W (FIG. 7A), but the light entrance efficiency of the light from the wavelength conversion member 30 to the light incident surface 20A is particularly high when the longitudinal diameter D is slightly smaller than the width W (FIG. 7B). For example, when the width W of the light incident surface 20A is about 3.0 mm, the longitudinal diameter D of the container 32 is about 2.8 mm.

Figure 8A:
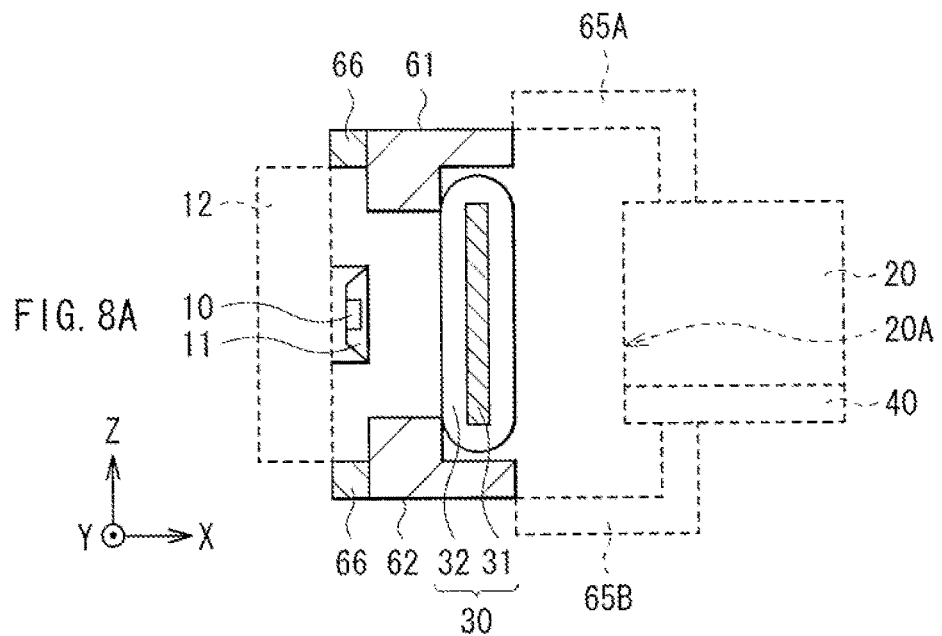
FIGS. 8A and 8B are sectional views each showing a modification of an eaves section illustrated in FIGS. 5A to 5C.
Figure 8B:
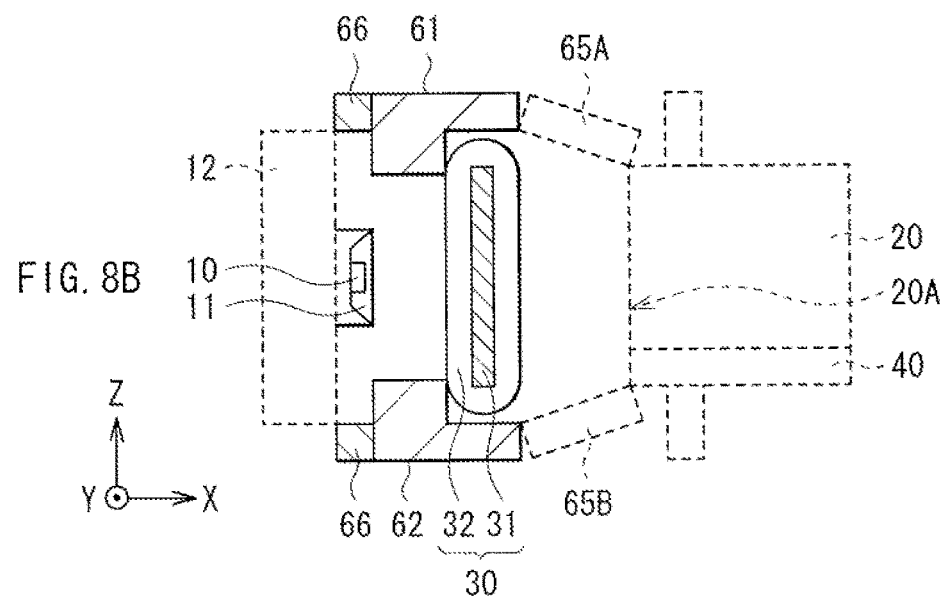

Eaves sections 65A and 65B are preferably provided in parallel to the top face section 61 and the bottom face section 62, respectively (FIG. 5C). For example, if the eaves sections 65A and 65B are bent at a right angle (FIG. 8A), or are inclined with respect to the top face section 61 and the bottom face section 62 (FIG. 8B), then a spot where vignetting of light is generated or accumulated exists between the wavelength conversion member 30 and the light guide plate 20 (the light incident surface 20A). This decreases the light entrance efficiency of the light from the wavelength conversion member 30 to the light guide plate 20.

As illustrated in FIG. 9A, the wavelength conversion member 30 and the light incident surface 20A of the light guide plate 20 are distanced by, for example, about 1.2 mm in consideration of the thermal expansion coefficient of the container 32 and the light guide plate 20, etc., but this distance may be decreased down to, for example, about 0.05 mm as illustrated in FIG. 9B. If the holding member 70 (the eaves sections 65A and 65B) and the light guide plate 20 are fixed together by, for example, an adhesive agent or the like, then the thermal expansion of the light guide plate 20 and that of the holding member 70 agree with each other, and thus it is possible to shorten the distance between the wavelength conversion member 30 and the light incident surface 20A of the light guide plate 20. The holding member 70 may include side walls (not illustrated) facing each other along the extending direction of the wavelength conversion member 30 (along the Y direction).

Third Embodiment

Figure 10:
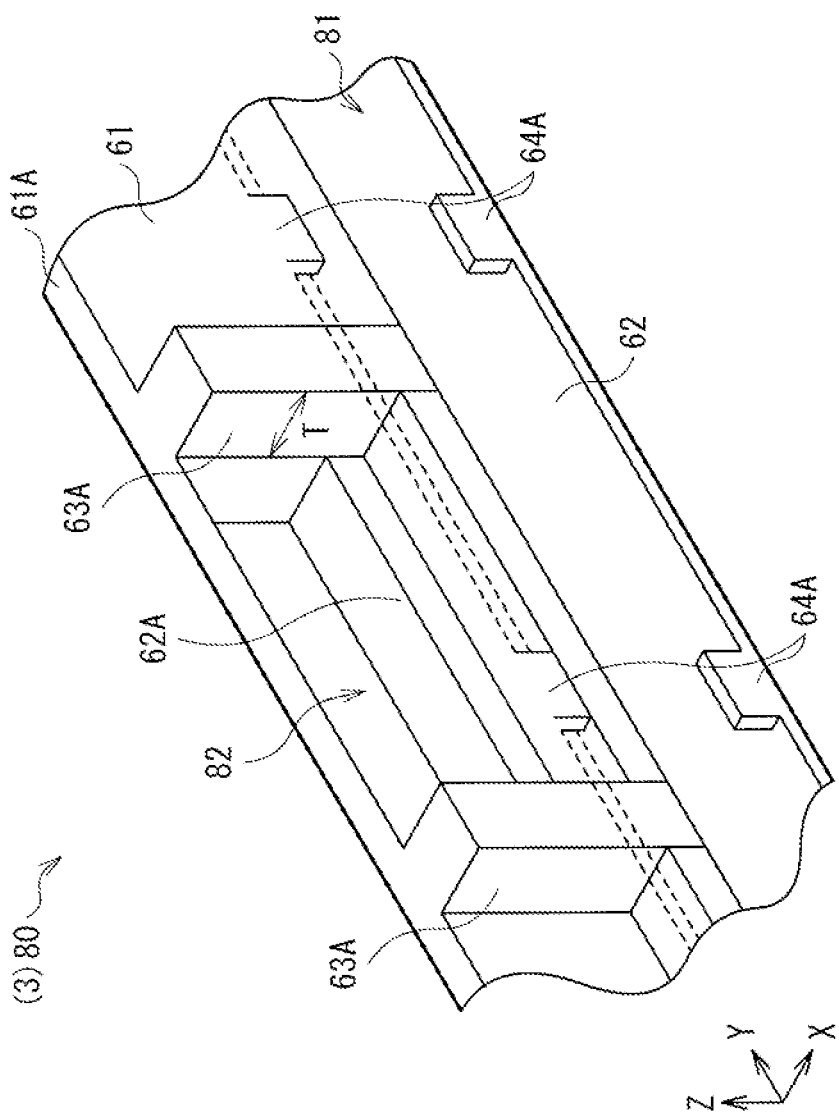
FIG. 10 is a perspective view showing a configuration of a holding member (light emitting unit) according to a third embodiment of the present technology.

A light emitting unit (light emitting unit 3) according to a third embodiment of the present technology includes a holding member 80 illustrated in FIG. 10. The holding member 80 includes a first housing section 81 provided to hold the wavelength conversion member 30 and a second housing section 82 provided to hold the light source 10. The second housing section 82 is integrated with the first housing section 81. Except for that point, the light emitting unit 3 is the same as the light emitting unit 2 of the above-mentioned second embodiment in configuration, functions, and effects.

Similarly to the holding member 70, the first housing section 81 includes the top face section 61, the bottom face section 62, the first lock section 63A, and the second lock section 64A. FIG. 10 shows a middle section of the holding member 80, and the illustration of the top face section 61 is omitted. The second housing section 82 is provided adjacent to the first housing section 81 on a side opposite to the light guide plate 20. The second housing section 82 includes the top face section 61A and the bottom face section 62A facing each other in the Z direction.

Figure 11A:
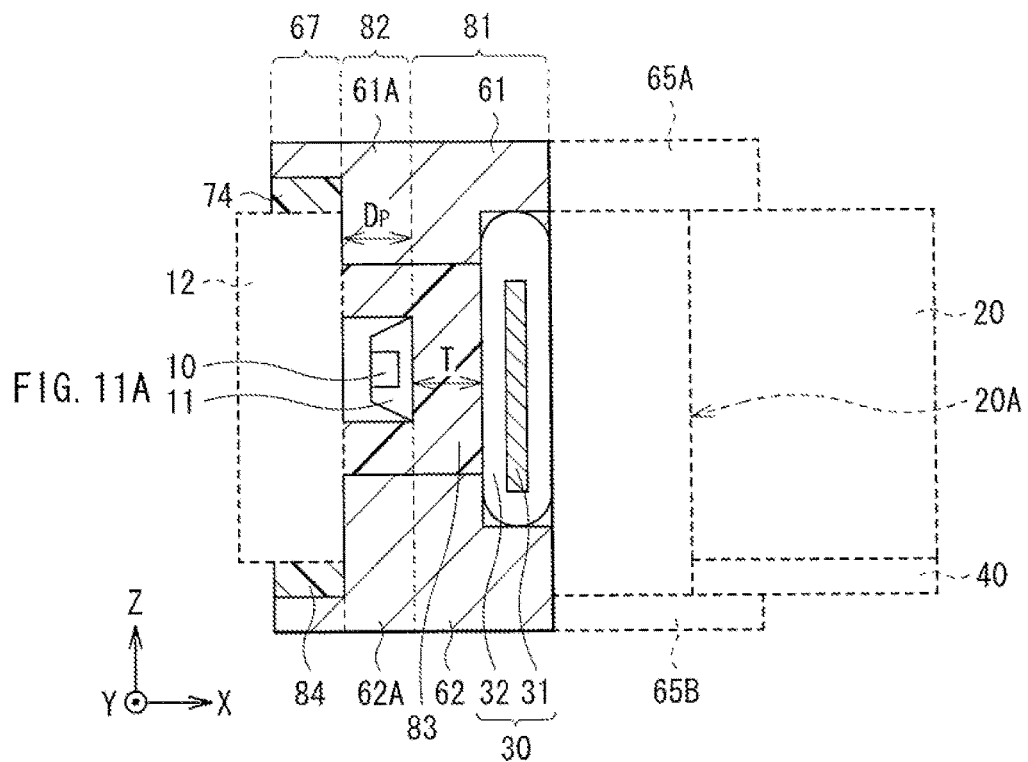
FIGS. 11A and 11B are sectional views each showing a state where a wavelength conversion member is fixed to the holding member illustrated in FIG. 10.
Figure 11B:
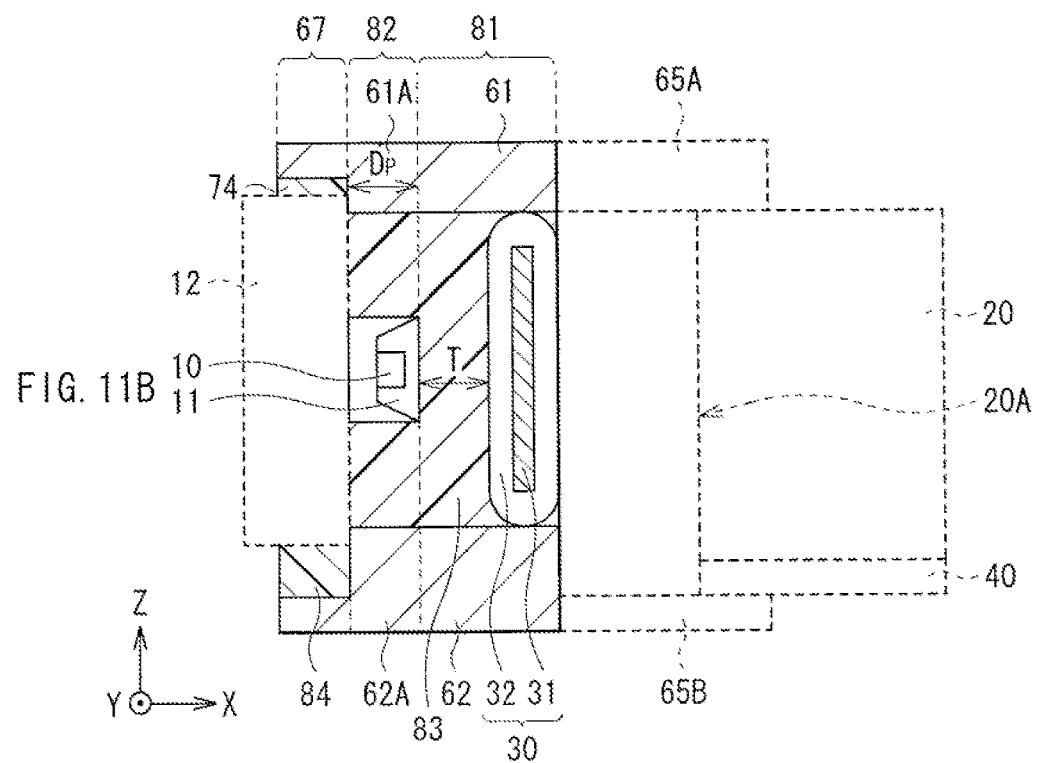

FIGS. 11A and 11B each show a cross-sectional configuration of a state where the wavelength conversion member 30 is fixed to the holding member 80. With the holding member 80, light of the light source 10 enters the wavelength conversion member 30 through an opening (second opening) of the second housing section 82 between the top face section 61A and the bottom face section 62A, and the light that has passed through the wavelength conversion member 30 proceeds to the light incident surface 20A of the light guide plate 20 through an opening (first opening) of the first housing section 81 between the top face section 61 and the bottom face section 62. In other words, with the holding member 80, it is possible to suppress the expansion of the light of the light source 10 by the top face section 61A and the bottom face section 62A, and thus to enhance the use efficiency of the light generated at the light source 10. A depth DP (in the X direction) of the second housing section 82 is substantially equal to the thickness of the package 11. Similarly to the above-mentioned holding member 60, the second housing section 82 is preferably made of a material having a high reflectance, and in addition thereto, the top face section 61A and the bottom face section 62A are preferably provided at a position near the light source 10 (the package 11). The front surfaces of the top face section 61A and the bottom face section 62A (the surfaces of the top face section 61A and the bottom face section 62A opposite to the other surfaces thereof facing each other), configure the same planes as the front surfaces of the top face section 61 and the bottom face section 62, respectively, for example. Similarly to the above-mentioned holding member 70, also in the holding member 80, the light source 10 and the wavelength conversion member 30 are distanced by the thickness T of the first lock section 63A or more. Preferably, a protrusion section 67 is provided on a rear side of the second housing section 82 (a side opposite to the first housing section) so as to fix the light source substrate 12 to this protrusion section 67 by, for example, an adhesive agent 84.

The size of the opening of the first housing section 81 (on the light incident surface 20A side) and the size of the opening of the second housing section 82 (on the wavelength conversion member 30 side) may be different from each other (FIG. 11A), or may be equal to each other (FIG. 11B). However, in the case where a step exists between the first housing section 81 and the second housing section 82 (FIG. 11A), vignetting of light may occur in a space between the light source 10 and the wavelength conversion member 30, and thus the light entrance efficiency may be decreased. Accordingly, the surfaces of the top face section 61 and the bottom face section 62 that face each other and configure the opening of the first housing section 81, and the surfaces of the top face section 61A and the bottom face section 62A that face each other and configure the opening of the second housing section 82 preferably form the same planes (FIG. 11B).

It is preferable to fill the first housing section 81 and the second housing section 82 with a transparent filler 83. Examples of the filler 83 include PMMA and PC. It is preferable to use as the filler 83 an elastic body having a high transmittance to the light generated at the light source 10 and the wavelength conversion member 30, and having a refractive index close to the refractive index of the container 32 (for example, refractive index n of glass is 1.52). The refractive index n of PMMA is 1.49, and the refractive index of PC is 1.59. The filler 83 may also be provided between the wavelength conversion member 30 and the light guide plate 20.

[Modification 1]

Figure 12:
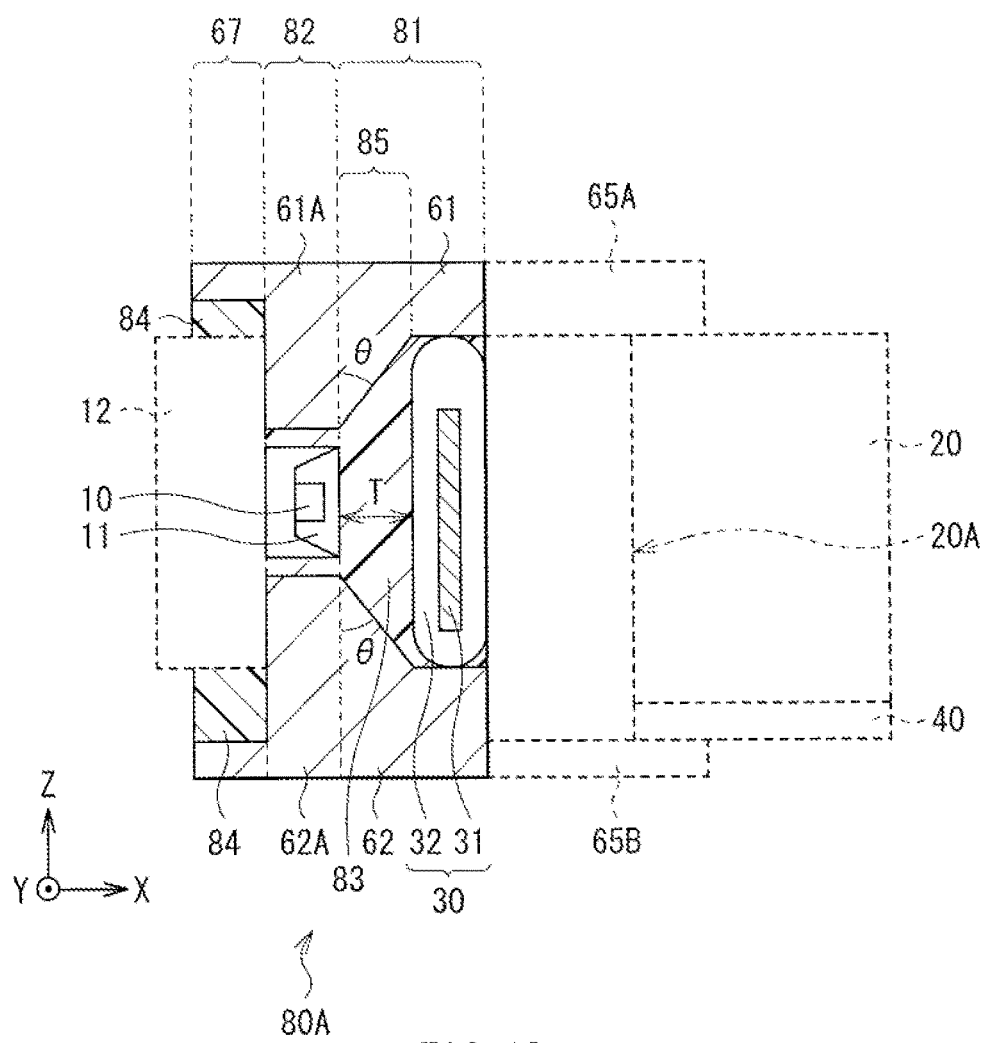
FIG. 12 is a sectional view showing a configuration of a holding member according to a modification 1.

FIG. 12 shows a cross-sectional configuration of a holding member (holding member 80A) according to a modification 1 of the above-mentioned third embodiment, together with the wavelength conversion member 30, etc. This holding member 80A includes a tapered section 85 provided to guide the light of the light source 10 from the opening of the second housing section 82 to the opening of the first housing section 81. Except for that point, the holding member 80A is the same as the holding member 80 of the above-mentioned third embodiment in configuration, functions, and effects.

The tapered section 85 is provided in the first housing section 81, and is located between the wavelength conversion member 30 and the light source 10 when the wavelength conversion member 30 is fixed at the opening of the first housing section 81 and the light source 10 is fixed at the second housing section 82. The opening of the second housing section 82 is smaller than that of the first housing section 81, and the top face section 61A and the bottom face section 62A of the second housing section 82 are provided at a position closer to the light source 10 than the top face section 61 and the bottom face section 62 of the first housing section 81. The tapered section 85 is a section that continuously (successively) changes the size of the opening from the size of the opening of the second housing section 82 to the size of the opening of the first housing section 81. Specifically, the opening of the tapered section 85 has an inverted tapered form from the light source 10 side toward the wavelength conversion member 30 side. With such a tapered section 85, it is possible to dispose the top face section 61A and the bottom face section 62A at a position near the light source 10, and to eliminate the step between the first housing section 81 and the second housing section 82 (for example, FIG. 11A). Consequently, it is possible to enhance the light entrance efficiency of the light from the light source 10 to the wavelength conversion member 30. The tapered section 85 has a taper angle $\theta$ of, for example, about 45 degrees. Preferably, the taper angle $\theta$ is appropriately adjusted according to the size of the light source 10 and the container 32, and the like.

[Modification 2]

Figure 13:
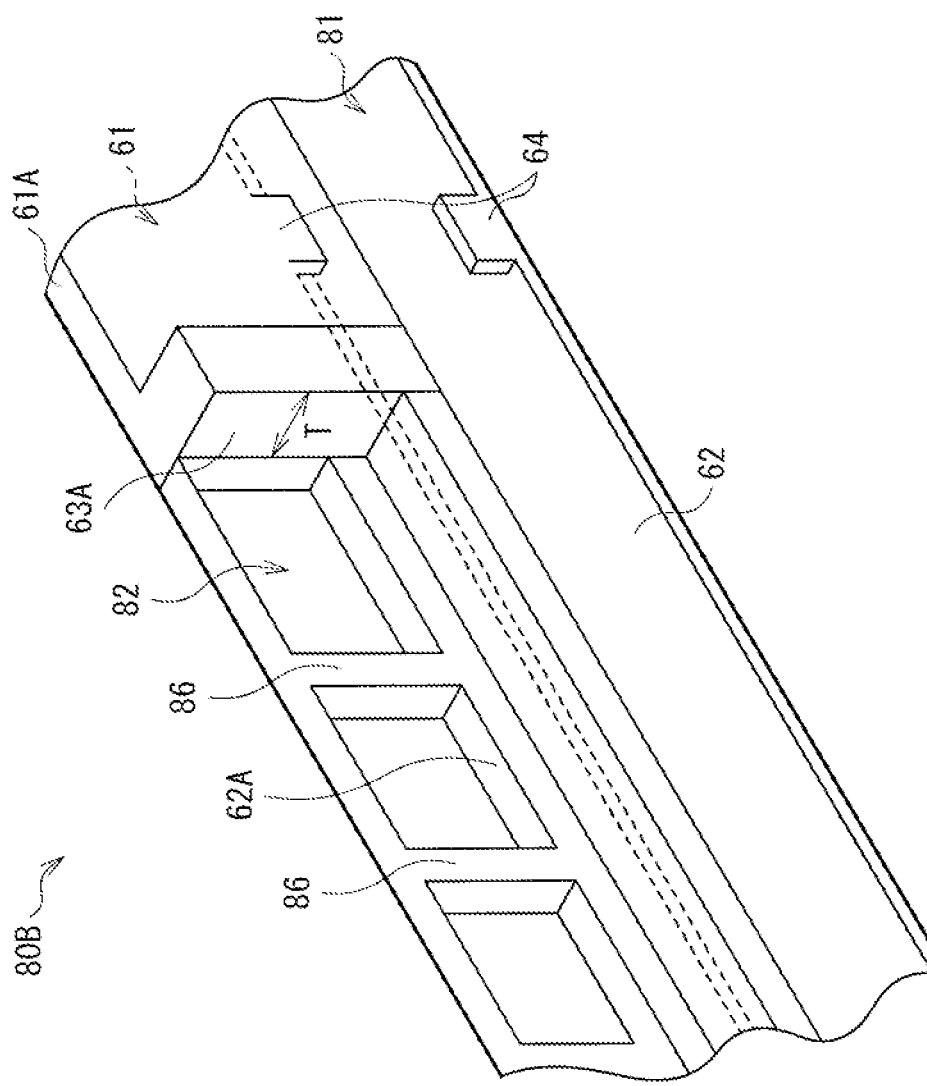
FIG. 13 is a perspective view showing a configuration of a holding member according to a modification 2.

FIG. 13 shows a configuration of a main part of a holding member (holding member 80B) according to a modification 2 of the above-mentioned third embodiment. The holding member 80B includes reflection sections 86 located between a plurality of the light sources 10 held at the second housing section 82. Except for that point, the holding member 80B is the same as the above-mentioned holding member 80 in configuration, functions, and effects. FIG. 13 shows a middle section of the holding member 80B, and the illustration of the top face section 61 is omitted.

The reflection sections 86 are provided between the light sources 10 adjacent to each other so as to reflect, to the light incident surface 20A side of the light guide plate 20, the light emitted from the wavelength conversion member 30 to the light source 10 side, and the like. The reflection sections 86 each have, for example, a columnar shape, and are jointed to the top face section 61A and the bottom face section 62A of the second housing section 82. Preferably, the reflection sections 86 fill up the gap between light sources 10 adjacent to each other, and the light sources 10 and the reflection sections 86 are alternately disposed without a gap therebetween. Such reflection sections 86 make it possible to enhance the use efficiency of the light generated at the light source 10.

When the wavelength conversion member 30 is provided between the light source 10 and the light incident surface 20A of the light guide plate 20, uniform light is stably obtained. However, since the wavelength conversion member 30 emits light in all directions as mentioned above, the intensity of the light generated at the light source 10 may be decreased before reaching the light guide plate 20. In addition, reflection may occur on the surface of the container 32 of the wavelength conversion member 30. In this instance, since the reflection sections 86 are provided, it is possible to reflect, to the light incident surface 20A side of the light guide plate 20, the light emitted from the wavelength conversion member 30 to the light source 10 side. The reflection sections 86 are also capable of redirecting, back to the light guide plate 20 side, the light which is emitted from the light source 10 or the wavelength conversion member 30 and then reflected at the container 32, and part of the holding member 80B such as the first lock section 63A, for example.

Consequently, it is possible to improve the use efficiency of the light generated at the light source 10 by the reflection section 86, and thus to suppress decrease in luminance. In addition, providing the first housing section 81 with the tapered section (the tapered section 85 in FIG. 12) makes it possible to also enhance the light entrance efficiency of the light from the light source 10 to the wavelength conversion member 30. It is preferable to provide the reflecting surface of the reflection section 86 and the light emission surface of the light source 10 (the package 11) on the same plane. Similarly to the above-mentioned holding member 60, for example, the reflection section 86 is made of a highly reflective PC, a highly reflective PPA, a highly reflective PPA/PCT, a highly reflective epoxy resin, or the like, and is integrated with the top face section 61A and the bottom face section 62A. The first lock section 63A has a thickness T of, for example, about 0.03 mm. Specifically, the first lock section 63A protrudes toward the wavelength conversion member 30 side by about 0.03 mm with respect to the reflecting surface of the reflection section 86 and the light emission surface of the light source 10.

APPLICATION EXAMPLES

Figure 14:
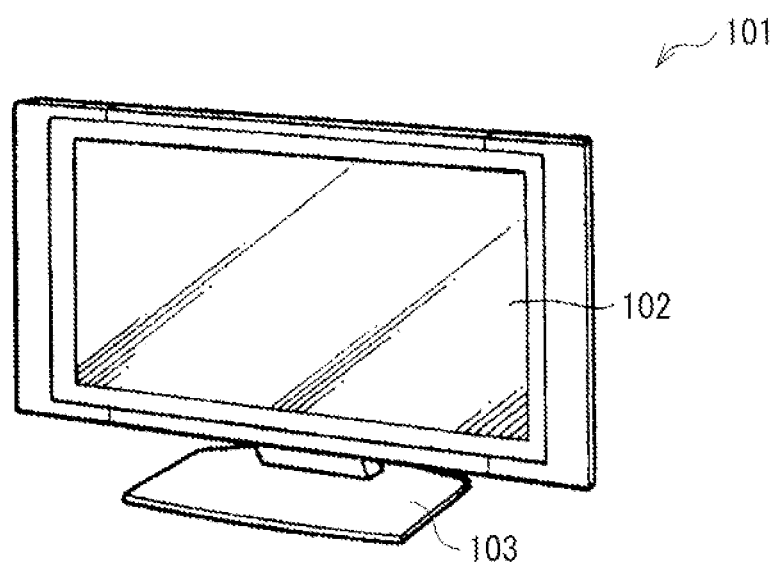
FIG. 14 is a perspective view showing an external appearance of a display to which the light emitting unit illustrated in FIG. 1 and so forth is applied.

FIG. 14 shows an example of an external appearance of a display 101 to which the above-mentioned light emitting unit 1 (or, the light emitting unit 2 or 3) is applied. The display 101 is used as a flat television, for example, and has a configuration in which a plate-shaped main body section 102 for image display is supported by a stand 103. The display 101 is used as a standing type display which is mounted on a horizontal plane such as a floor, a shelf, and a stand with the stand 103 attached to the main body section 102, but the display 101 may also be used as a wall-hanging type display in a state where the stand 103 is dismounted from the main body section 102.

Figure 15:
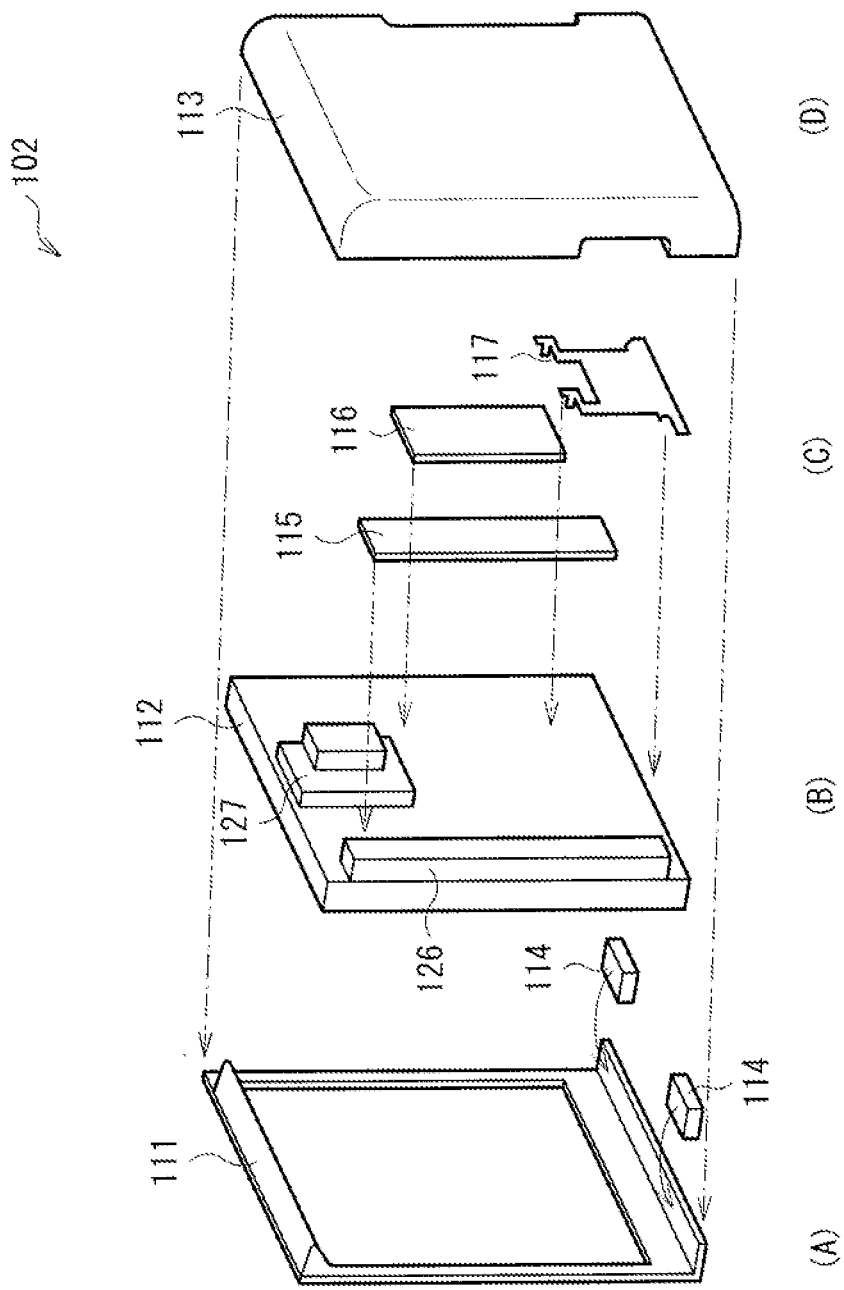
FIG. 15 is a perspective view showing a main body section illustrated in FIG. 14 in an exploded manner.

FIG. 15 shows the main body section 102 illustrated in FIG. 14 in an exploded manner. The main body section 102 includes, for example, from the front face side (viewer side) thereof, a front exterior member (bezel) 111, a panel module 112, and a rear exterior member (rear cover) 113 in this order. The front exterior member 111 is a member of a frame shape that covers a front peripheral section of the panel module 112, and a pair of speakers 114 is disposed at a lower section of the front exterior member 111. The panel module 112 is fixed to the front exterior member 111, and on the back face thereof, a power source substrate 115 and a signal substrate 116 are mounted, and an attachment metal part 117 is fixed. The attachment metal part 117 is used to attach a wall-hanging bracket, a substrate, the stand 103, and the like. The rear exterior member 113 covers the back face and side face of the panel module 112.

Figure 16:
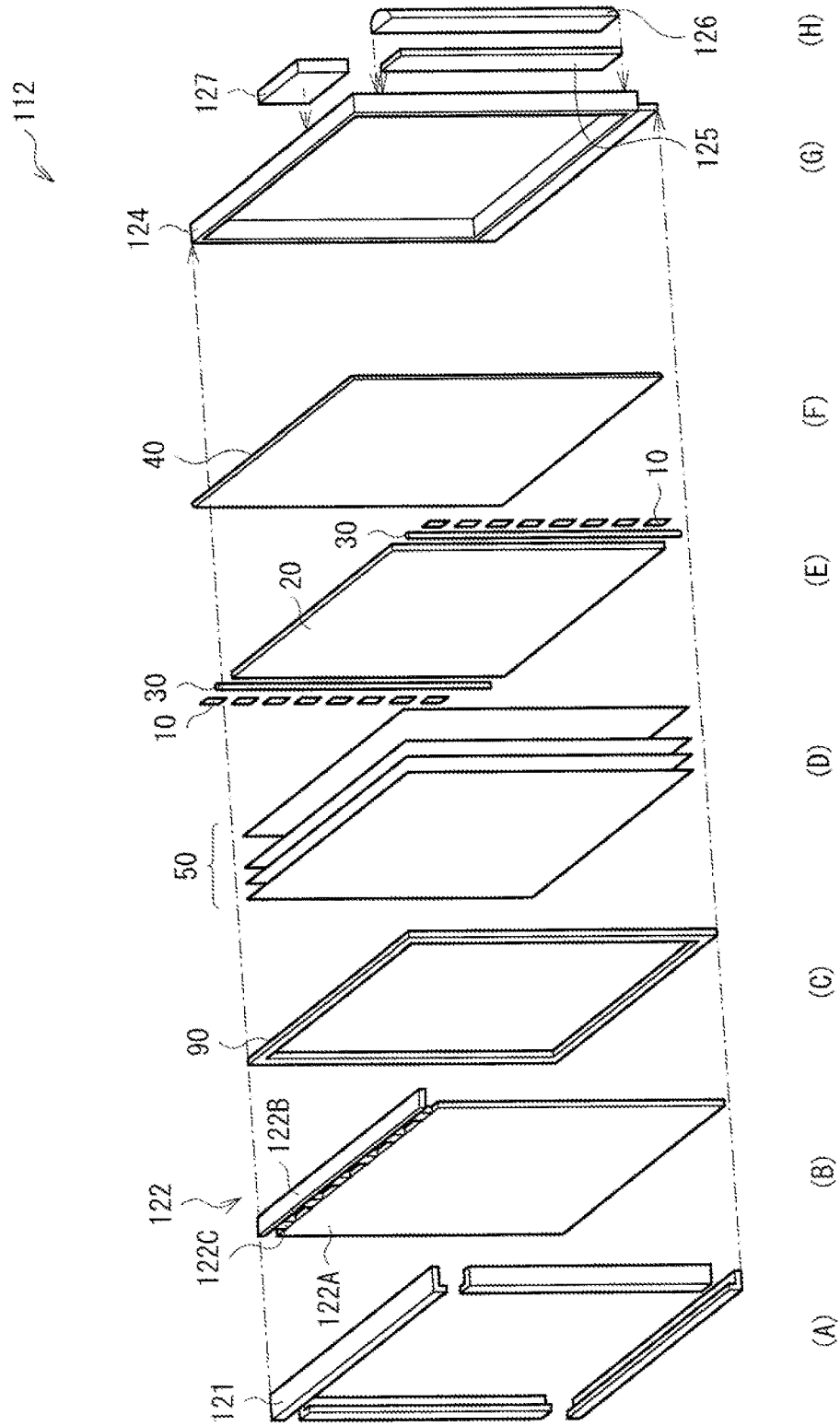
FIG. 16 is a perspective view showing a panel module illustrated in FIG. 15 in an exploded manner.

FIG. 16 shows the panel module 112 illustrated in FIG. 15 in an exploded manner. The panel module 112 includes, for example, from the front face side (viewer side) thereof, a front housing (top chassis) 121, a liquid crystal panel 122, a frame shape member (middle chassis) 90, the light emitting unit 1, a rear housing (back chassis) 124, a balancer substrate 125, a balancer cover 126, and a timing control substrate 127 in this order.

The front housing 121 is a frame-shaped metal part that covers a front peripheral section of the liquid crystal panel 122. The liquid crystal panel 122 includes, for example, a liquid crystal cell 122A, a source substrate 122B, and a flexible substrate 122C that is configured of a COF (chip on film) or the like and connects the liquid crystal cell 122A and the source substrate 122B to each other. The frame shape member 90 is a frame-shaped resin part that holds the liquid crystal panel 122 and the optical sheet 50 of the light emitting unit 1. The rear housing 124 is a metal part that is made of iron (Fe) or the like and houses the liquid crystal panel 122, the frame shape member 90, and the light emitting unit 1. The balancer substrate 125 controls the light emitting unit 1. The balancer substrate 125 is mounted on the back face of the rear housing 124, and is covered by the balancer cover 126. The timing control substrate 127 is also mounted on the back face of the rear housing 124.

In the display 101, the light from the light emitting unit 1 is selectively transmitted by the liquid crystal panel 122, and thus image display is performed. In this instance, since the light emitting unit 1 with improved reliability is employed as described above, the display 101 stably performs uniform display.

Application examples in which the above-mentioned panel module 112 is applied to electronic apparatuses will be described below. Such electronic apparatuses include, for example, a television, a digital camera, a notebook personal computer, a mobile terminal apparatus such as a mobile phone, and a video camcorder. In other words, the above-mentioned display may be applied to electronic apparatuses in various fields which display an externally inputted video signal or an internally generated video signal as an image or a video.

Application Example 1

Figure 17A:
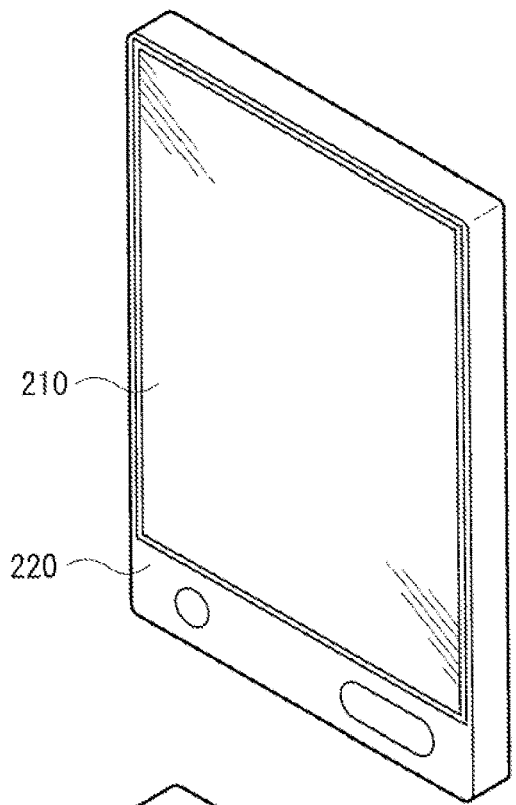
FIGS. 17A and 17B are perspective views each showing an external appearance of an application example 1 of the panel module illustrated in FIG. 15.
Figure 17B:
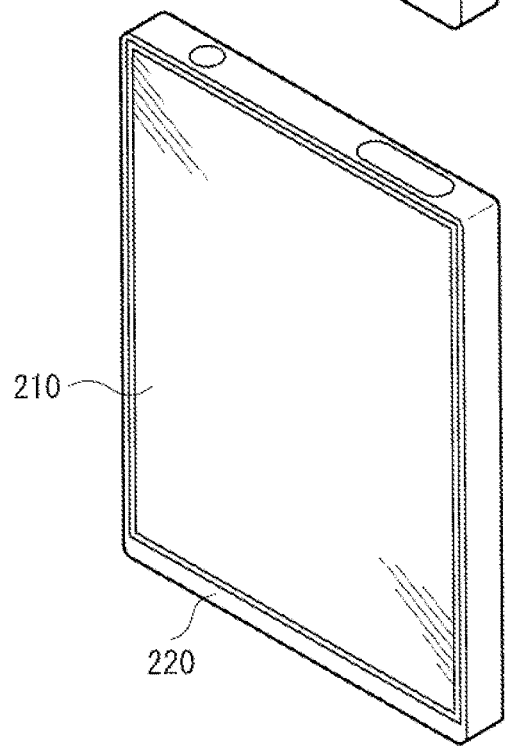

FIG. 17A and FIG. 17B each show an external appearance of an electronic book to which the panel module 112 is applied. The electronic book includes, for example, a display section 210 and a non-display section 220, and the display section 210 is configured of the display 101.

Application Example 2

Figure 18:
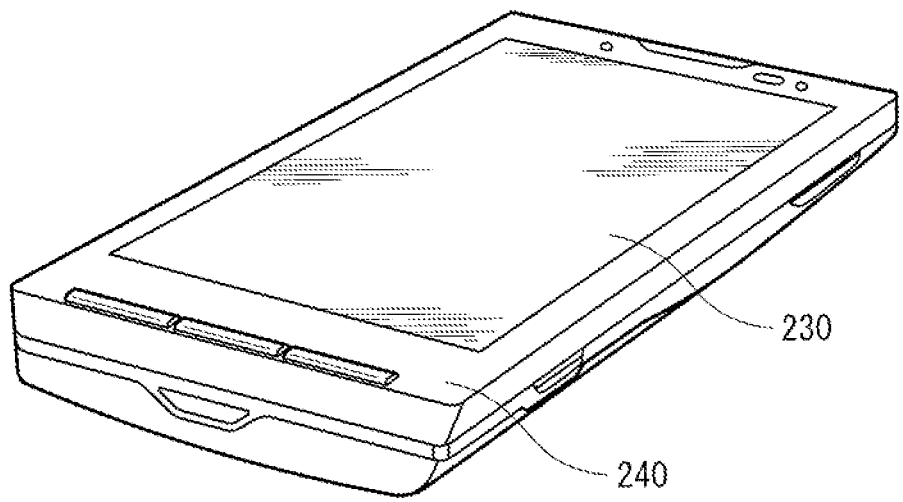
FIG. 18 is a perspective view showing an external appearance of an application example 2.

FIG. 18 shows an external appearance of a smartphone to which the panel module 112 is applied. The smartphone includes, for example, a display section 230 and a non-display section 240, and the display section 230 is configured of the display 101.

Application Example 3

Figure 19A:
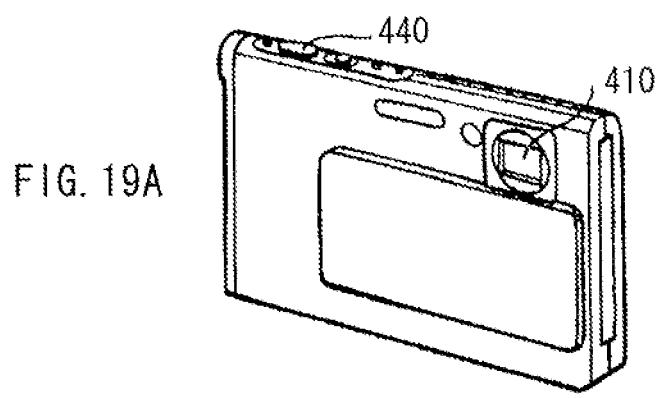
FIG. 19A is a perspective view showing an external appearance of an application example 3 as viewed from a front side.
Figure 19B:
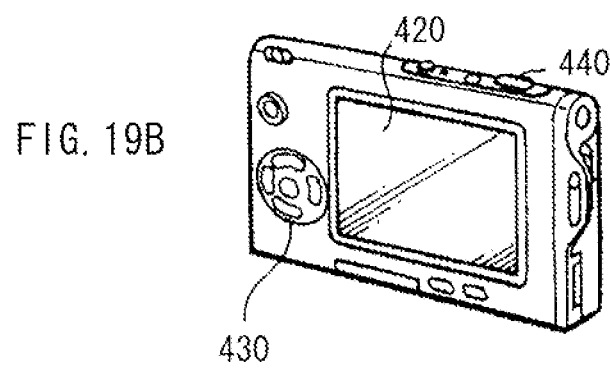
FIG. 19B is a perspective view showing an external appearance thereof as viewed from a rear side.

FIGS. 19A and 19B each show an external appearance of a digital camera to which the panel module 112 is applied. The digital camera includes, for example, a light emitting section 410 for generating flash light, a display section 420, a menu switch 430, and a shutter button 440, and the display section 420 is configured of the display 101.

Application Example 4

Figure 20:
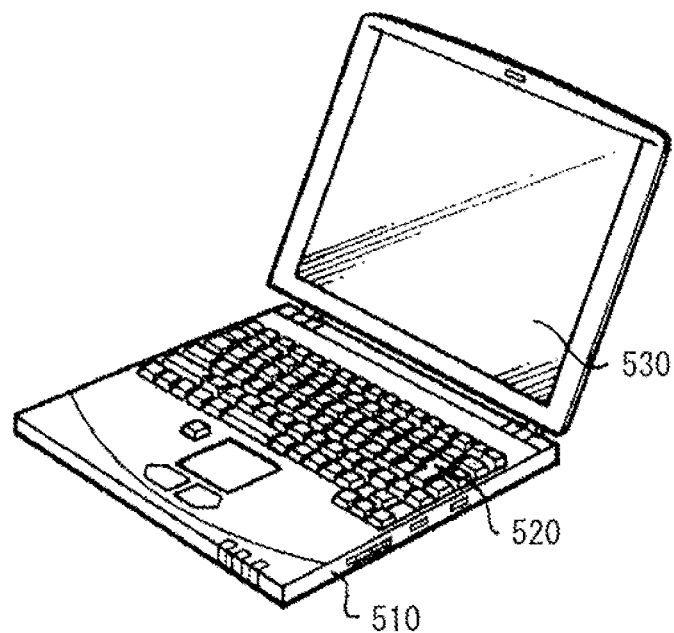
FIG. 20 is a perspective view showing an external appearance of an application example 4.

FIG. 20 shows an external appearance of a notebook personal computer to which the panel module 112 is applied. The notebook personal computer includes, for example, a main body 510, a keyboard 520 used to input letters and the like, and a display section 530 used to display an image, and the display section 530 is configured of the display 101.

Application Example 5

Figure 21:
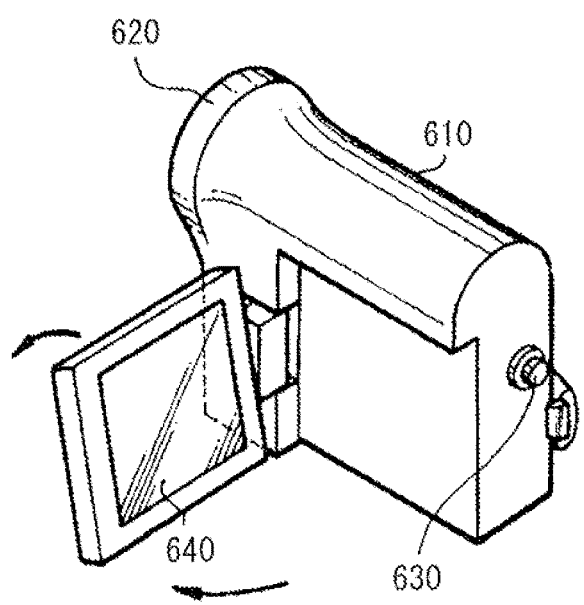
FIG. 21 is a perspective view showing an external appearance of an application example 5.
Figure 22:
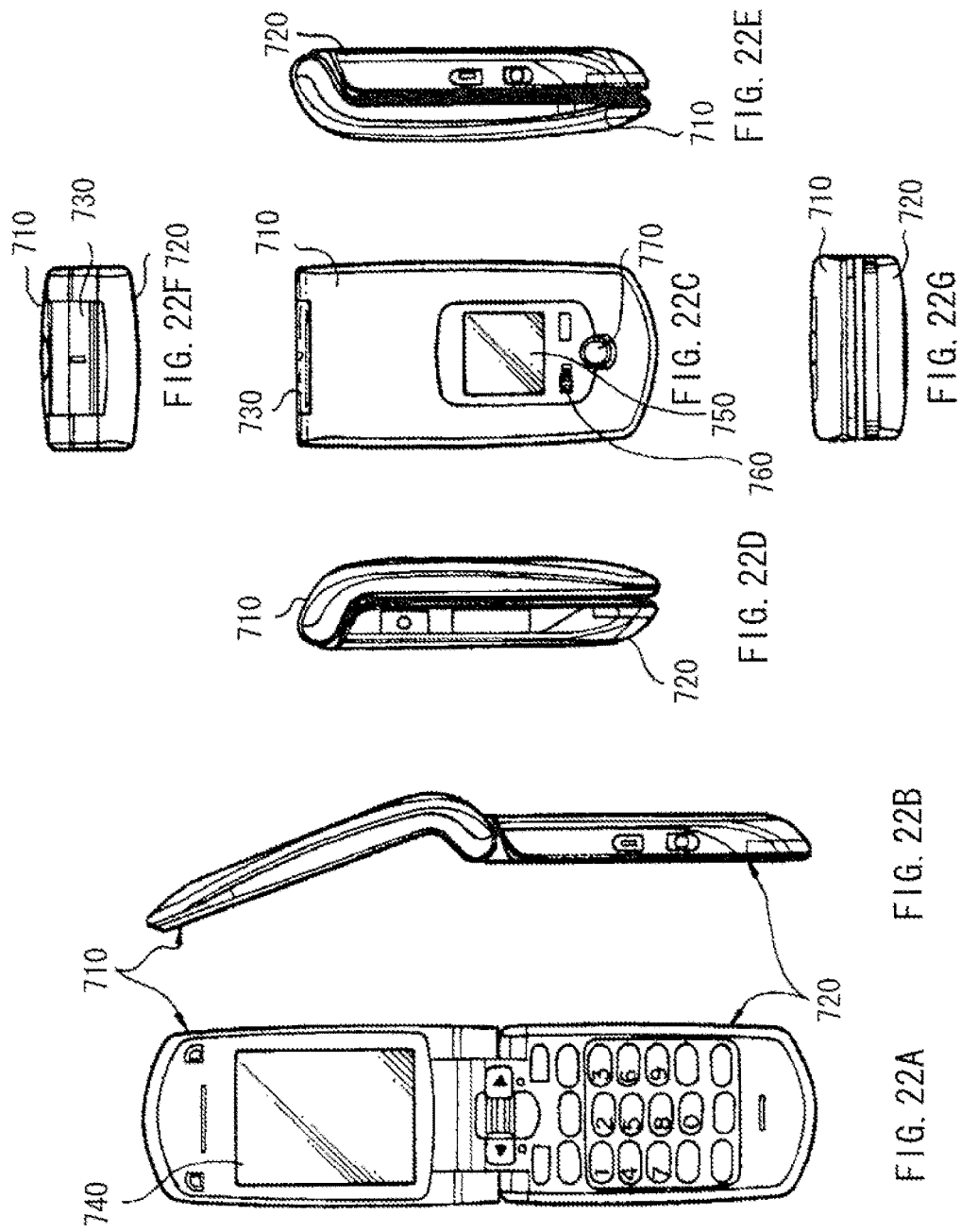
FIG. 22A is a front view showing an application example 6 in an unfolded state.
FIG. 22B is a side view thereof.
FIG. 22C is a front view in a folded state.
FIG. 22D is a left side view.
FIG. 22E is a right side view.
FIG. 22F is a top view.
FIG. 22G is a bottom view.

FIG. 21 shows an external appearance of a video camcorder to which the panel module 112 is applied. The video camcorder includes, for example, a main body section 610, a lens 620 provided on a front side of the main body section 610 and used to take an image of a subject, a start-and-stop switch 630 for capturing an image and a display section 640. The display section 640 is configured of the display 101.

Application Example 6

FIGS. 22A to 22G each show an external appearance of a mobile phone to which the panel module 112 is applied. The mobile phone includes, for example, an upper housing 710, a lower housing 720, a coupling section (hinge section) 730 that couples the upper housing 710 and the lower housing 720, a display 740, a sub-display 750, a picture light 760, and a camera 770. The display 740 or the sub-display 750 is configured of the display 101.

Figure 23:
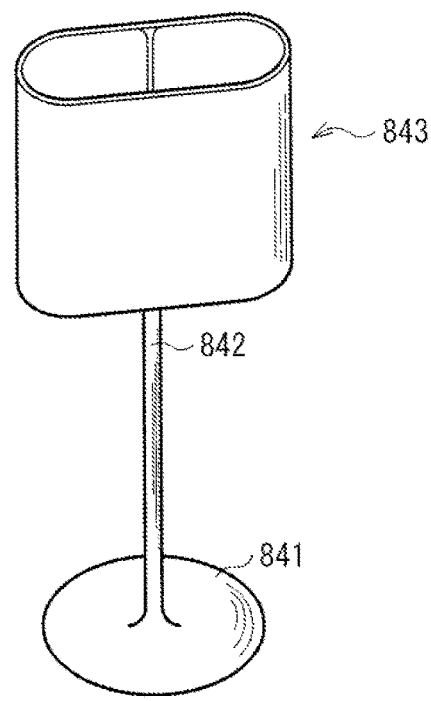
FIG. 23 is a perspective view showing an external appearance of a lighting apparatus to which the light emitting unit illustrated in FIG. 1 and so forth is applied.
Figure 24:
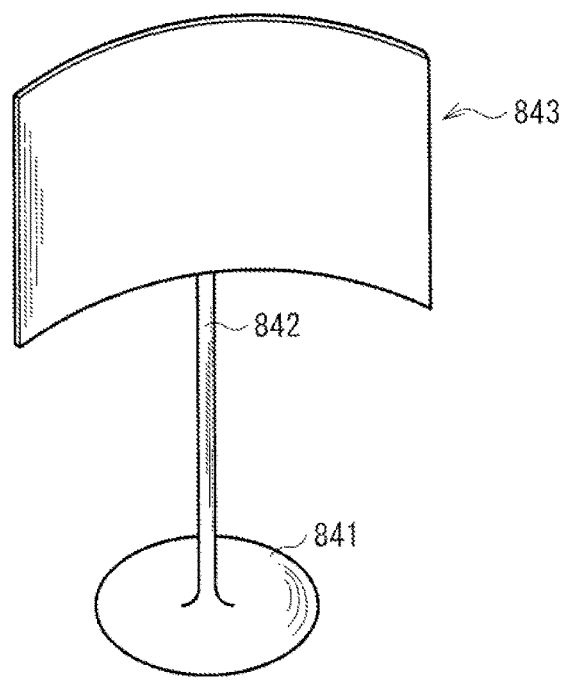
FIG. 24 is a perspective view showing another example of the lighting apparatus illustrated in FIG. 23.

FIG. 23 shows an external appearance of a lighting apparatus to which the above-mentioned light emitting unit 1 (or the light emitting unit 2 or 3) is applied. The lighting apparatus is a table-top lighting apparatus, and includes, for example, a base 841, a support pole 842 provided on the base 841, and an illumination section 843 mounted to the support pole 842. This illumination section 843 is configured of the above-mentioned light emitting unit 1. When the light guide plate 20 is formed in a curved shape, the illumination section 843 may have any forms such as a cylindrical form illustrated in FIG. 23 and a curved form illustrated in FIG. 24.

Figure 25:
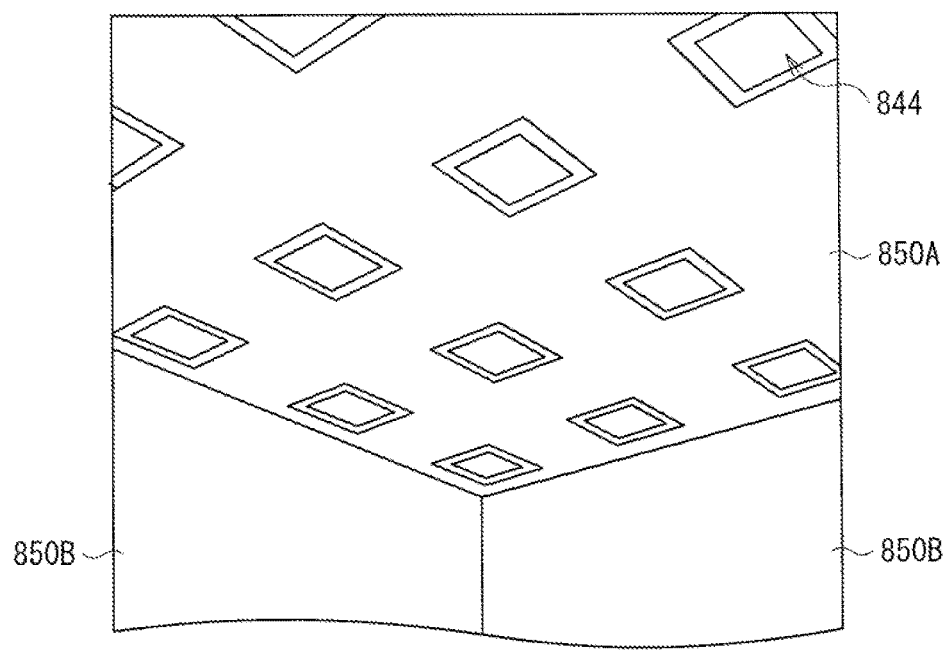
FIG. 25 is a perspective view showing still another example of the lighting apparatus illustrated in FIG. 23.

The light emitting unit 1 (or the light emitting unit 2 or 3) may be applied to a lighting apparatus for indoor use illustrated in FIG. 25. In the lighting apparatus, an illumination section 844 is configured of the above-mentioned light emitting unit 1. Any number of the illumination sections 844 may be disposed on a ceiling 850A of a building at any intervals. It is to be noted that, instead of the ceiling 850A, the illumination section 844 may be installed at any places such as a wall 850B and a floor (not illustrated) as usage.

In the lighting apparatuses described above, illumination is performed using the light from the light emitting unit 1. In this instance, since the light emitting unit 1 with improved reliability is employed as described in the first embodiment, it is possible to stably obtain uniform light.

Examples

In the following, examples of the present technology will be described in detail.

It was assumed that the light entrance efficiency of the light from the light source to the light incident surface was 1.0 (Ref.) when light was caused to enter the light guide plate without providing the wavelength conversion member and the holding member. Based on this, the light entrance efficiency of the light emitting unit 1 (or the light emitting unit 2 or 3) according to the above-mentioned embodiment and so forth was calculated and determined. The conditions same as those of Ref. were used except for the wavelength conversion member and the holding member. Incidentally, all calculation results were determined under the condition where the light incident surface 20A of the light guide plate 20 had a width W of about 3.3 mm.

Experiment 1

The light entrance efficiency of the light emitting unit 1 provided with the holding member 60 illustrated in FIG. 2 was determined. The holding member 60 supported the wavelength conversion member 30 over the extending direction of the container 32 by the first lock section 63 and the second lock section 64. The longitudinal diameter D of the container 32 was set at about 4.0 mm.

Experiment 2

The light entrance efficiency of the light emitting unit 3 provided with the holding member 80 illustrated in FIG. 11A was determined. The holding member 80 included the second housing section 82 that housed the light source 10, in addition to the first housing section 81 that housed the wavelength conversion member 30. The opening (about 2.2 mm in diameter) of the second housing section 82 was smaller than the opening (about 2.8 mm in diameter) of the first housing section 81, and a step existed between the second housing section 82 and the first housing section 81. Similarly to the experiment 1, the longitudinal diameter D of the container 32 was set at about 4.0 mm.

Experiment 3

Except that the longitudinal diameter D of the container 32 was set at about 2.8 mm, the light entrance efficiency of the light emitting unit 2 was determined similarly to the experiment 2.

Experiment 4

The light entrance efficiency of the light emitting unit 3 provided with the holding member 80 illustrated in FIG. 11B was determined. In the holding member 80, the opening of the second housing section 82 and that of the first housing section 81 were equal to each other in size (about 2.8 mm in diameter), and no step existed between the first housing section 81 and the second housing section 82. Except for that point, calculation was carried out similarly to the experiment 3.

Experiment 5

The light entrance efficiency of the light emitting unit 3 provided with the holding member 80A illustrated in FIG. 12 was determined. The holding member 80A was provided with the tapered section 85 at the first housing section 81. Specifically, the opening (about 2.2 mm in diameter) of the second housing section 82 was smaller than the opening (about 2.8 mm in diameter) of the first housing section 81, but no step existed between the first housing section 81 and the second housing section 82. The taper angle θ was set at about 45 degrees. Except for that point, calculation was carried out similarly to the experiment 3.

Experiment 6

Except that the first housing section 81 and the second housing section 82 were filled with the filler 83, the light entrance efficiency of the light emitting unit 3 was determined similarly to the experiment 5. PMMA was used as the filler 83.

Experiment 7

The light entrance efficiency of the light emitting unit 3 provided with the holding member 80B illustrated in FIG. 13 was determined. The holding member 80B was provided with the reflection sections 86 between the light sources 10 adjacent to each other. Except for that point, calculation was carried out similarly to the experiment 5.

Results of the above-mentioned experiments 1 to 7 are shown in Table 1.

TABLE 1

| Experiments | Holding Member | D (mm) | Second Housing Section | Form of Opening | Filler | Reflection Section | Light Entrance Efficiency |
|---|---|---|---|---|---|---|---|
| Ref. | not provided | — | — | — | — | — | 1.0 |
| 1 | 60 (FIG. 2) | 4.0 | not provided | — | — | — | 0.612 |
| 2 | 80 (FIG. 11A) | 4.0 | provided | step | Not provided | Not provided | 0.695 |
| 3 | 80 (FIG. 11A) | 2.8 | provided | step | not provided | not provided | 0.718 |
| 4 | 80 (FIG. 11B) | 2.8 | provided | no step | not provided | not provided | 0.736 |
| 5 | 80A (FIG. 12) | 2.8 | provided | taper | not provided | not provided | 0.762 |
| 6 | 80A (FIG. 12) | 2.8 | provided | taper | PMMA | not provided | 0.798 |
| 7 | 80B (FIG. 13) | 2.8 | provided | taper | not provided | provided | 0.788 |

By comparing the experiment 1 and the experiment 2, it is confirmed that, when the wavelength conversion member 30 is supported by the first lock section 63A and the second lock section 64A at a part of the container 32, vignetting of light between the light source 10 and the wavelength conversion member 30, and between the wavelength conversion member 30 and the light incident surface 20A of the light guide plate 20 is decreased, and thus the light entrance efficiency is improved. In addition, preferably the longitudinal diameter D of the container 32 of the wavelength conversion member 30 is close in size to the width W of the light incident surface 20A, and, is smaller than the width W (experiments 2 and 3). Preferably no step is disposed between the first housing section 81 and the second housing section 82 (experiments 3 and 4). Further, the closer the top face section 61A and the bottom face section 62A of the second housing section 82 are to the light source 10, the more light entrance efficiency is improved (experiments 4 and 5). Additionally, when the first housing section 81 and the second housing section 82 are filled with the filler 83, the light entrance efficiency is further enhanced (experiments 5 and 6). In addition, providing the reflection section 86 also improves the light entrance efficiency (experiments 5 and 7).

Hereinabove, while the present technology has been described with reference to the embodiments and modifications, the present technology is not limited to the above-mentioned embodiments, and various modifications may be made. For example, while the light source 10 that generates blue light is used in the above-mentioned embodiments and so forth, the light source 10 may also generate light of other colors such as red and green, or may generate light other than visible light, for example, ultraviolet light. In addition, while blue light is caused to pass through the wavelength conversion member 30 to generate white light in the above-mentioned embodiments and so forth, light of other colors than white, such as red, red-orange, blue, and green may also be generated, for example.

Additionally, while the light incident surface 20A of the light guide plate 20 is provided at both the left and right end surfaces in the above-mentioned embodiments and so forth, the light incident surface 20A may be provided at only one of the four end surfaces (upper, lower, left, and right) surrounding the main surface, or at three or more of the four end surfaces. In addition, it is also possible to configure the light emitting unit 1 (or the light emitting units 2 or 3) as a back-lit type by disposing the light source 10 at a position facing the main surface of the light guide plate 20. Further, it is only necessary that the planar shape of the light guide plate 20 corresponds to the form of an object to be irradiated by the light emitting unit 1, and the planar shape of the light guide plate 20 may be other shapes than rectangular shape.

Additionally, while the light guide plate is used as an optical part in the above-mentioned embodiments and so forth, the convex section 20C of the light guide plate 20 may be omitted, and the light guide plate 20 may be made of a gel material. Alternatively, for example, the light emitted from the wavelength conversion member 30 may be guided by components of the lighting apparatus, the display 101, and the like.

Furthermore, while the case where the light source is an LED has been described in the above-mentioned embodiments and so forth, the light source 10 may also be configured of a semiconductor laser or the like.

Furthermore, while the configurations of the light emitting units 1, 2, and 3, the display 101 (television), and the like have been described in detail in the above-mentioned embodiments, all of the components need not necessarily be included, and other components may further be included.

Further, for example, the materials and thicknesses of the components described in the above-mentioned embodiments are not limitative, and other materials and thicknesses may also be employed.

It is to be noted that the present technology may be configured as follows.

(1) A light emitting unit including:
a light source;
an optical part including a light incident surface, the light incident surface facing the light source;
a wavelength conversion member provided between the light source and the light incident surface; and
a holding member holding the wavelength conversion member at a position between the light source and the light incident surface of the optical part.

(2) The light emitting unit according to (1), wherein
the holding member includes a first lock section and a second lock section, the first lock section being provided nearer to the light source than the optical part, the second lock section being provided nearer to the optical part than the light source, and
the wavelength conversion member is fixed between the first lock section and the second lock section.

(3) The light emitting unit according to (2), wherein the wavelength conversion member is distanced from the light source by a predetermined distance by a thickness of the first lock section.

(4) The light emitting unit according to (2) or (3), wherein
the holding member includes a top face section and a bottom face section separated from each other,
light of the light source proceeds to the light incident surface of the optical part through a space between the top face section and the bottom face section, and the first lock section and the second lock section are provided at a part of the top face section and the bottom face section.

(5) The light emitting unit according to any one of (1) to (4), wherein the wavelength conversion member includes a wavelength conversion material sealed in a tubular container.

(6) The light emitting unit according to (5), wherein the wavelength conversion material contains quantum dots.

(7) The light emitting unit according to any one of (2) to (6), wherein the holding member includes a first housing section and a second housing section integrated with the first housing section, the first housing section including the first lock section and the second lock section, the second housing section housing the light source.

(8) The light emitting unit according to (7), wherein
the first housing section includes a first opening through which light from the wavelength conversion member is extracted, and
the second housing section includes a second opening through which the light of the light source is extracted.

(9) The light emitting unit according to (8), wherein
the second opening is smaller than the first opening, and
the first housing section includes a tapered section that guides the light of the light source from the second opening to the first opening.

(10) The light emitting unit according to (8), wherein the first opening and the second opening have a substantially same size.

(11) The light emitting unit according to any one of (7) to (9), further including:
a plurality of the light sources, wherein
the second housing section includes a reflection section located between the light sources, the reflection section being configured to redirect, back to the light incident surface side, light coming from the wavelength conversion member side.

(12) The light emitting unit according to (5), wherein the container has a cross-sectional longitudinal diameter equal to or smaller than a width of the light incident surface.

(13) The light emitting unit according to any one of (1) to (12), wherein the holding member contains a resin mixed with titanium oxide.

(14) The light emitting unit according to (13), wherein the resin contains any one of polycarbonate (PC), polyphthalamide (PPA), polycyclohexylene dimethylene terephthalate (PPA/PCT), and an epoxy resin.

(15) The light emitting unit according to (2), wherein the holding member includes an eaves section that holds the optical part, the eaves section being disposed on an outer side of the second lock section.

(16) The light emitting unit according to any one of (1) to (15), wherein
the optical part is a light guide plate, and
the light incident surface is an end surface of the light guide plate.

(17) The light emitting unit according to any one of (1) to (16), wherein the light source is a blue light source.

(18) The light emitting unit according to any one of (1) to (17), wherein the light source is a light emitting diode (LED).

(19) A display with a liquid crystal panel and a light emitting unit disposed on a back side of the liquid crystal panel, the light emitting unit including:
a light source;
an optical part including a light incident surface, the light incident surface facing the light source;
a wavelength conversion member provided between the light source and the light incident surface; and
a holding member holding the wavelength conversion member at a position between the light source and the light incident surface of the optical part.

(20) A lighting apparatus with a light emitting unit, the light emitting unit including:
a light source;
an optical part including a light incident surface, the light incident surface facing the light source;
a wavelength conversion member provided between the light source and the light incident surface; and
a holding member holding the wavelength conversion member at a position between the light source and the light incident surface of the optical part.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting unit comprising:
a light source;
an optical part including a light incident surface, the light incident surface facing the light source;
a wavelength conversion member provided between the light source and the light incident surface; and
a holding member holding the wavelength conversion member at a position between the light source and the light incident surface of the optical part,
wherein the holding member includes a first lock section and a second lock section, the first lock section being provided nearer to the light source than the optical part, the second lock section being provided nearer to the optical part than the light source, and the wavelength conversion member is fixed between the first lock section and the second lock section, and
wherein a thickness of the first lock section is set according to a thermal expansion coefficient of the wavelength conversion member.

2. The light emitting unit according to claim 1, wherein the wavelength conversion member is distanced from the light source by a predetermined distance by the thickness of the first lock section.

3. The light emitting unit according to claim 1, wherein
the holding member includes a top face section and a bottom face section separated from each other,
light of the light source proceeds to the light incident surface of the optical part through a space between the top face section and the bottom face section, and
the first lock section and the second lock section are provided at a part of the top face section and the bottom face section.

4. The light emitting unit according to claim 1, wherein the wavelength conversion member includes a wavelength conversion material sealed in a tubular container.

5. The light emitting unit according to claim 4, wherein the wavelength conversion material contains quantum dots.

6. The light emitting unit according to claim 4, wherein the container has a cross-sectional longitudinal diameter equal to or smaller than a width of the light incident surface.

7. The light emitting unit according to claim 1, wherein the holding member includes a first housing section and a second housing section integrated with the first housing section, the first housing section including the first lock section and the second lock section, the second housing section housing the light source.

8. The light emitting unit according to claim 7, wherein
the first housing section includes a first opening through which light from the wavelength conversion member is extracted, and
the second housing section includes a second opening through which the light of the light source is extracted.

9. The light emitting unit according to claim 8, wherein
the second opening is smaller than the first opening, and
the first housing section includes a tapered section that guides the light of the light source from the second opening to the first opening.

10. The light emitting unit according to claim 8, wherein the first opening and the second opening have a substantially same size.

11. The light emitting unit according to claim 7, further comprising:
a plurality of the light sources, wherein
the second housing section includes a reflection section located between the light sources, the reflection section being configured to redirect, back to the light incident surface side, light coming from the wavelength conversion member side.

12. The light emitting unit according to claim 1, wherein the holding member contains a resin mixed with titanium oxide.

13. The light emitting unit according to claim 12, wherein the resin contains any one of polycarbonate (PC), polyphthalamide (PPA), polycyclohexylene dimethylene terephthalate (PPA/PCT), and an epoxy resin.

14. The light emitting unit according to claim 1, wherein the holding member includes an eaves section that holds the optical part, the eaves section being disposed on an outer side of the second lock section.

15. The light emitting unit according to claim 1, wherein
the optical part is a light guide plate, and
the light incident surface is an end surface of the light guide plate.

16. The light emitting unit according to claim 1, wherein the light source is a blue light source.

17. The light emitting unit according to claim 1, wherein the light source is a light emitting diode (LED).

18. A display with a liquid crystal panel and a light emitting unit disposed on a back side of the liquid crystal panel, the light emitting unit comprising:
a light source;
an optical part including a light incident surface, the light incident surface facing the light source;
a wavelength conversion member provided between the light source and the light incident surface; and
a holding member holding the wavelength conversion member at a position between the light source and the light incident surface of the optical part,
wherein the holding member includes a first lock section and a second lock section, the first lock section being provided nearer to the light source than the optical part, the second lock section being provided nearer to the optical part than the light source, and the wavelength conversion member is fixed between the first lock section and the second lock section, and
wherein a thickness of the first lock section is set according to a thermal expansion coefficient of the wavelength conversion member.

19. A lighting apparatus with a light emitting unit, the light emitting unit comprising:
a light source;
an optical part including a light incident surface, the light incident surface facing the light source;
a wavelength conversion member provided between the light source and the light incident surface; and
a holding member holding the wavelength conversion member at a position between the light source and the light incident surface of the optical part,
wherein the holding member includes a first lock section and a second lock section, the first lock section being provided nearer to the light source than the optical part, the second lock section being provided nearer to the optical part than the light source, and the wavelength conversion member is fixed between the first lock section and the second lock section, and
wherein a thickness of the first lock section is set according to a thermal expansion coefficient of the wavelength conversion member.

* * * * *